United States Patent
Fukushima et al.

(10) Patent No.: US 10,892,460 B2
(45) Date of Patent: Jan. 12, 2021

(54) WIRING MODULE FOR ATTACHMENT TO A POWER STORAGE MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Naoki Fukushima, Yokkaichi (JP); Osamu Nakayama, Yokkaichi (JP); Katsushi Miyazaki, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(*) Notice: Subject to any disclaimer, the term of this patent is extended or adjusted under 35 U.S.C. 154(b) by 168 days.

(21) Appl. No.: 16/082,775

(22) PCT Filed: Apr. 12, 2017

(86) PCT No.: PCT/JP2017/015042
§ 371 (c)(1),
(2) Date: Sep. 6, 2018

(87) PCT Pub. No.: WO2017/179637
PCT Pub. Date: Oct. 19, 2017

(65) Prior Publication Data
US 2019/0081307 A1    Mar. 14, 2019

(30) Foreign Application Priority Data
Apr. 12, 2016  (JP) ................. 2016-079453

(51) Int. Cl.
*H01M 2/20* (2006.01)
*H01G 11/10* (2013.01)
(Continued)

(52) U.S. Cl.
CPC ............ *H01M 2/206* (2013.01); *H01G 2/04* (2013.01); *H01G 11/10* (2013.01); *H01M 2/10* (2013.01);
(Continued)

(58) Field of Classification Search
CPC .......... H01M 2/206; H01M 2/20; H01M 2/30; H01M 2/10; H01M 2/34; H01G 2/04; H01G 11/10
(Continued)

(56) References Cited

U.S. PATENT DOCUMENTS

2015/0364872 A1* 12/2015 Nakayama .......... H01M 10/482
429/121

FOREIGN PATENT DOCUMENTS

| JP | 2011060675 A | 3/2011 |
|----|--------------|--------|
| JP | 2013020811 A | 1/2013 |
| JP | 2014149982 A | 8/2014 |

OTHER PUBLICATIONS

International Search Report and Written Opinion for Application No. PCT/JP2017/015042 dated Jul. 18, 2017; 5 pages.

\* cited by examiner

*Primary Examiner* — Gary D Harris
(74) *Attorney, Agent, or Firm* — Reising Ethington, P.C.

(57) ABSTRACT

A wiring module having a second protector is provided with a rear-side first latching portion and a front-side first latching portion that are elastically deformable. A cover is provided with a rear-side restraining portion and a front-side restraining portion. The rear-side restraining portion is disposed (Continued)

within a deflection space for the rear-side first latching portion, and restrains elastic deformation of the rear-side first latching portion. The front-side restraining portion is disposed within a deflection space for the front-side first latching portion, and restrains elastic deformation of the front-side first latching portion.

7 Claims, 18 Drawing Sheets

(51) Int. Cl.
  *H01M 2/10* (2006.01)
  *H01M 2/34* (2006.01)
  *H01G 2/04* (2006.01)
  *H01M 2/30* (2006.01)

(52) U.S. Cl.
  CPC ............... *H01M 2/20* (2013.01); *H01M 2/30* (2013.01); *H01M 2/34* (2013.01)

(58) Field of Classification Search
  USPC ........................................................ 429/158
  See application file for complete search history.

WIRING MODULE FOR ATTACHMENT TO A POWER STORAGE MODULE

CROSS REFERENCE TO RELATED APPLICATIONS

This application claims the priority of Japanese patent application JP2016-079453 filed on Apr. 12, 2016, the entire contents of which are incorporated herein.

TECHNICAL FIELD

The techniques disclosed in this specification relate to wiring modules.

BACKGROUND ART

A wiring module as disclosed in JP 2013-33634A is known as a conventional wiring module. The wiring module is attached to a power storage device group in which a plurality of power storage devices are lined up, and includes a connection member that is connected to the electrodes of the power storage devices.

The wiring module includes a positioning portion. The power storage device group and the wiring module are positioned using the positioning portion.

SUMMARY

As an engaging structure of the positioning portion, a configuration may be used in which the positioning portion is elastically engaged. In this case, if an external force is applied to the wiring module, the positioning portion may be elastically deformed, and the positioning portion may be disengaged.

The techniques disclosed in this specification have been made under the above-described circumstances.

A technique disclosed in this specification relates to a wiring module to be attached to a power storage module that includes a plurality of power storage devices that include electrodes, the wiring module including: a protector that includes a bus bar that is connectable to the electrodes, and is made of an insulating material; and a cover that covers the bus bar, wherein the protector is provided with a latching portion, and the cover is provided with a restraining portion that restrains elastic deformation of the latching portion and that is disposed within a deflection space for the latching portion.

With the configuration described above, even if a force is applied to the protector, the protector is restrained from being elastically deformed in a direction in which the latching portion is unlatched. Accordingly, it is possible to reliably latch the protector to the power storage module.

Also, a technique disclosed in this specification relates to a wiring module to be attached to a power storage module that includes a plurality of power storage devices that include electrodes, the wiring module including: a protector that includes a bus bar that is connected to a sub-bus bar that is connected to one of the electrodes, and is made of an insulating material; and a cover that covers the bus bar, wherein the protector is provided with a latching portion, and the cover is provided with a restraining portion that restrains elastic deformation of the latching portion and that is disposed within a deflection space for the latching portion.

With the configuration described above, even if a change is made to the specifications of the structure of the electrode terminals of the power storage devices, it is possible to easily cope with the change by changing the shape of the sub-bus bar. Also, the bus bar can be used commonly even if the specifications of the electrode terminals vary. Accordingly, the manufacturing cost can be reduced.

The embodiments of the techniques disclosed in this specification are preferably as follows.

It is preferable that the restraining portion includes a cover-side latching portion.

With the configuration described above, the restraining portion is fixed by the cover-side latching portion. Accordingly, it is possible to reliably restrain elastic deformation of the latching portion.

It is preferable that the restraining portion includes an abutment wall that abuts the latching portion and thereby restrains elastic deformation of the latching portion in a state in which the latching portion is disposed within the deflection space.

With the configuration described above, the abutment wall abuts the latching portion. Accordingly, it is possible to reliably restrains elastic deformation of the latching portion.

It is preferable that the abutment wall includes, on a face opposite to the latching portion, a reinforcing wall that extends in a direction away from the latching portion.

With the configuration described above, the abutment wall restrains the latching portion from being deflected or deformed when the abutment wall abuts the latching portion. Accordingly, it is possible to reliably restrain elastic deformation of the latching portion.

It is preferable that the restraining portion has a rectangular tube shape.

With the configuration described above, the restraining portion has a shape that is less deformable. Accordingly, it is possible to reliably restrain elastic deformation of the latching portion.

A bolt or a nut may be attached to the bus bar.

With the configuration described above, it is possible to keep the latching portion from being unlatched even if a force is applied to the protector via the bus bar when the bolt or the nut is attached to the bus bar.

A configuration is possible in which the bus bar includes a fastening portion to which the bolt or the nut is attached, and the latching portion is provided at a position spaced apart from an axis line of the bolt or the nut in a radial direction of the bolt or the nut.

When a bolt or a nut is attached to the fastening portion, a twisting force of the bolt or the nut acts on the insulation protector via the bus bar. Due to the principle of leverage, the twisting force increases as it moves away from the axis line of the bolt or the nut in the radial direction of the bolt or the nut. For this reason, when the latching portion is provided at a position spaced apart from the axis line of the bolt or the nut in the radial direction of the bolt or the nut, the latching portion may be easily unlatched. The techniques disclosed in this specification are effective in such a case.

According to the techniques disclosed in this specification, it is possible to reliably latch the protector and the power storage module.

DESCRIPTION OF EMBODIMENTS

Embodiment 1

Figure 1:
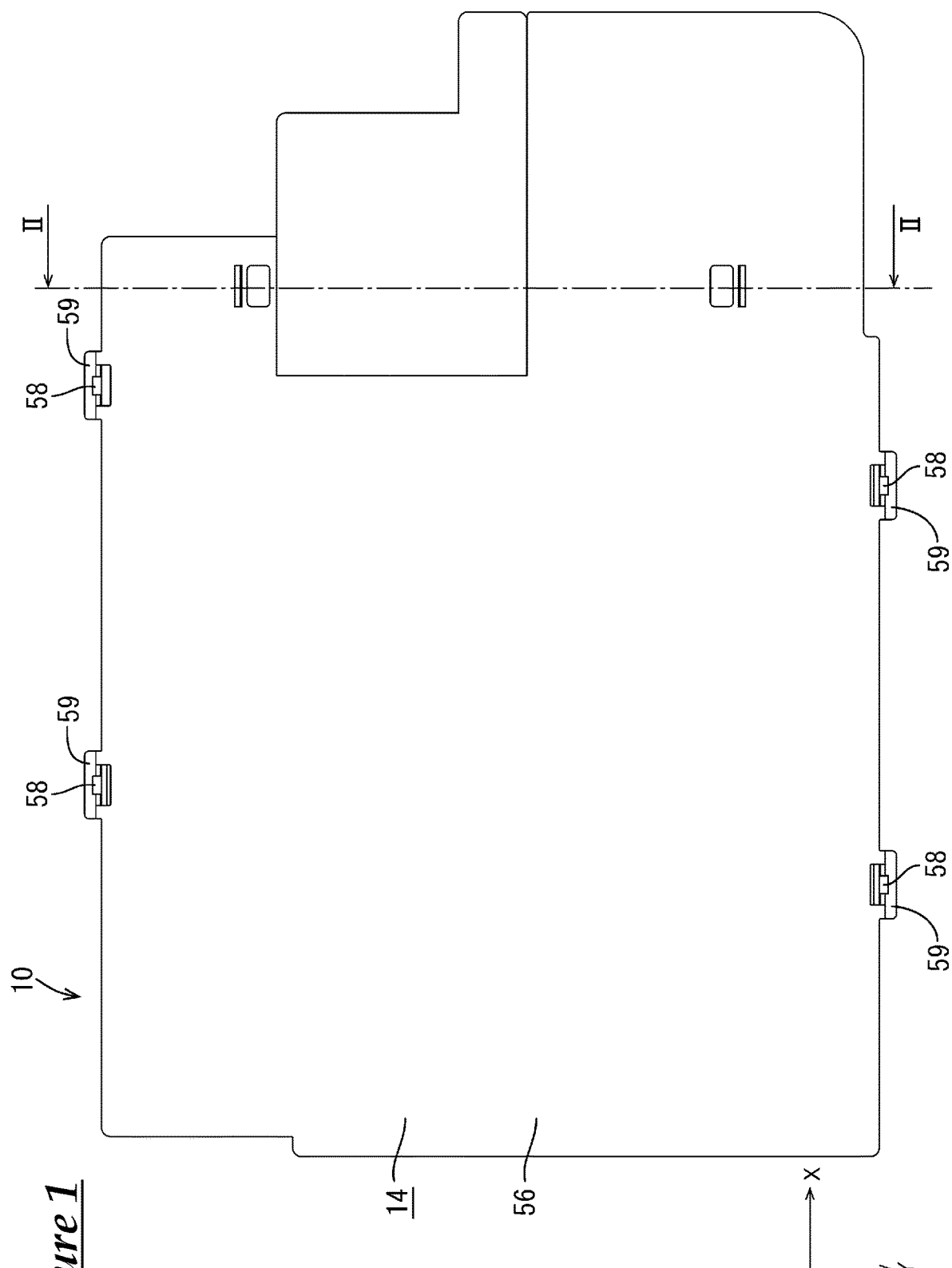
FIG. 1 is a plan view of a power storage module according to Embodiment 1.

Embodiment 1 that is a technique disclosed in this specification will be described with reference to FIGS. 1 to 11. A power storage module 10 according to Embodiment 1 is used as, for example, a vehicle driving source for driving an electric vehicle, a hybrid vehicle, or the like. In the description given below, the X-direction is defined as the right direction, the Y-direction is defined as the frontward direction, and the Z-direction is defined as the upward direction. For a plurality of identical members, only one of the members is labelled with a reference numeral, and other members may be left unlabeled.

Figure 3:
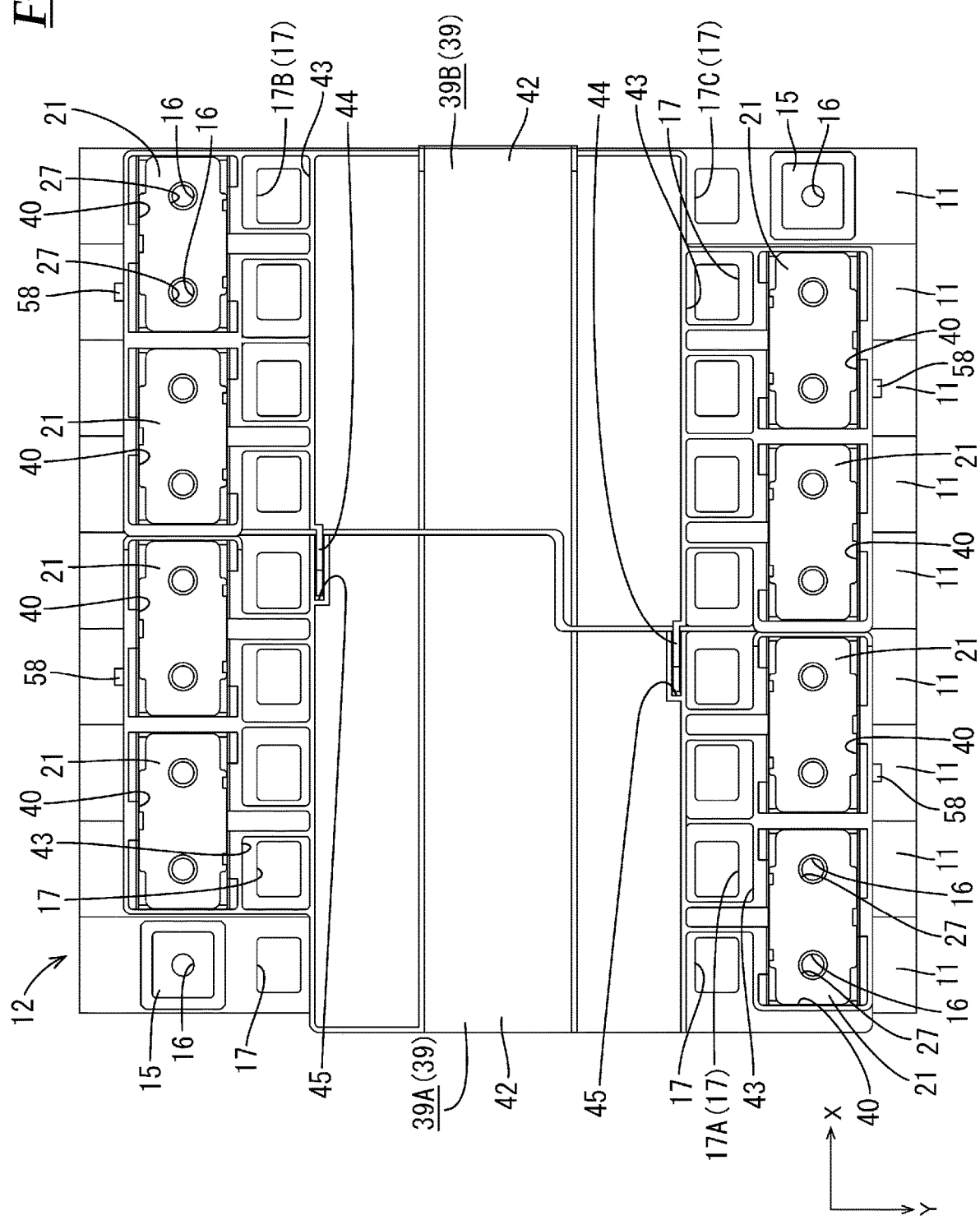
FIG. 3 is a plan view showing a state in which a connection protector has been assembled to a power storage device group.

A power storage device 11 houses a power storage element (not shown). As shown in FIG. 3, on the upper surface of the power storage device 11, upwardly protruding positive and negative electrodes 15 are lined up and spaced apart from each other in the front-rear direction. The electrodes 15 have a substantially rectangular prism shape. A screw hole 16 that extends in the vertical direction is formed on the upper surface of each electrode 15.

On the upper surface of the power storage device 11, latching holes 17 that extend in the vertical direction are formed at positions inward of the electrodes 15 in the front-rear direction. The latching holes 17 are blind holes. The latching holes 17 have a rectangular shape as viewed from above. The front-side hole edge portion of the latching holes 17 forms a front-side overhanging portion 18 that extends rearward. Likewise, the rear-side hole edge portion of the latching holes 17 form a rear-side overhanging portion 19 that extends frontward.

A plurality of power storage devices 11 are lined up in the right-left direction, thereby forming a power storage device group 12. The power storage devices 11 are disposed such that the orientations of adjacent power storage devices 11 are reversed in the front-rear direction. Accordingly, the polarities of adjacent electrodes 15 are opposite.

Figure 11:
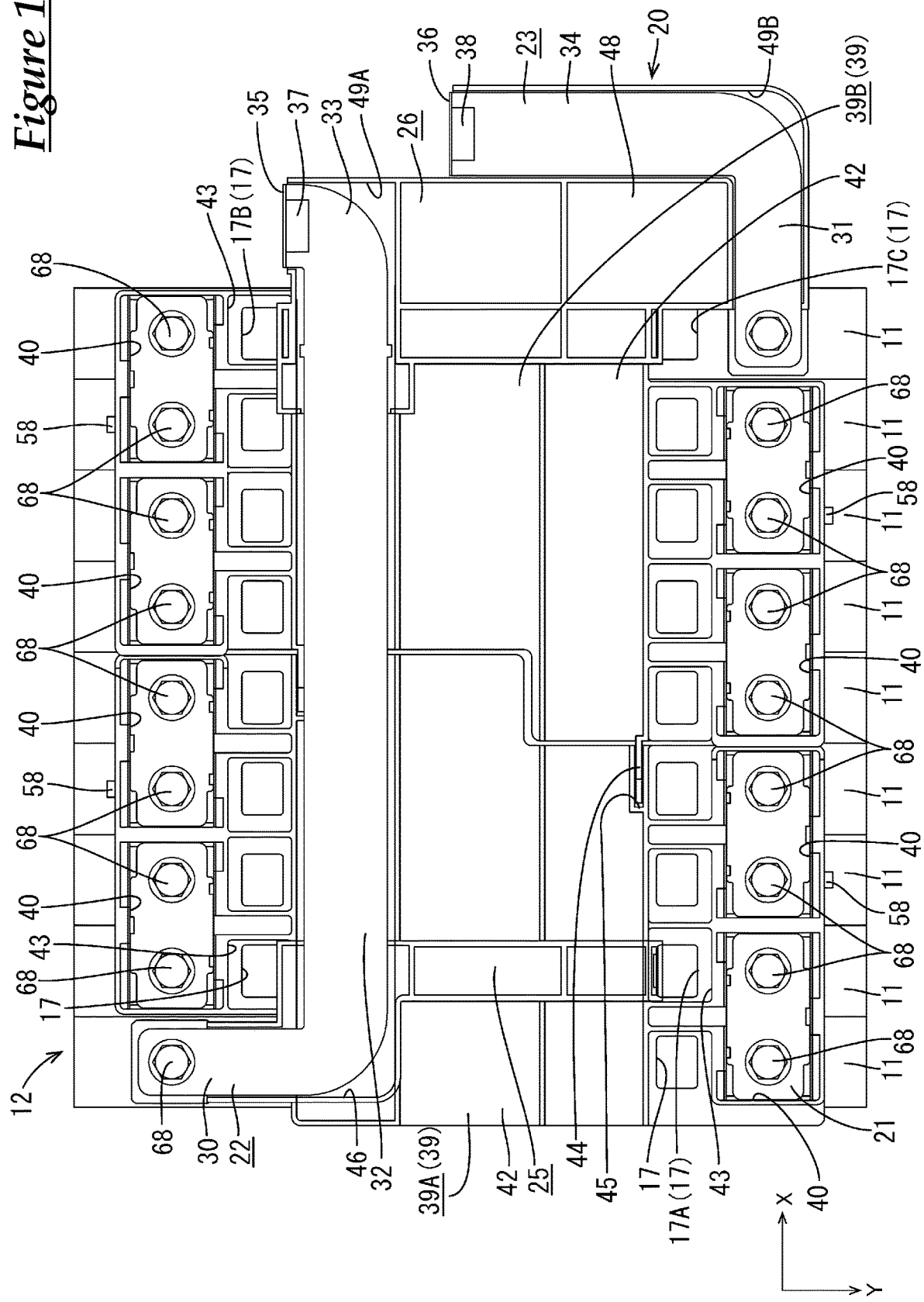
FIG. 11 is a plan view showing a state in which bolts are screwed into the screw holes of the electrodes after the connection protector, the first protector, and the second protector have been assembled to the power storage device group.

As shown in FIG. 11, a wiring module 20 is attached to the power storage device group 12. The wiring module 20 includes a first output bus bar 22 (an example of a bus bar) that is connected to a rear-side electrode 15 of a power storage device 11 that is positioned on the left end of the power storage device group 12, a second output bus bar 23 (an example of a bus bar) that is connected to a front-side electrode 15 of a power storage device 11 that is positioned on the right end of the power storage device group 12, a second protector 26 (an example of a protector) that holds the first output bus bar 22 and the second output bus bar 23, and a cover 14 that covers the first output bus bar 22 and the second output bus bar 23.

Furthermore, a connection protector 24 for holding a plurality of connection bus bars 21 that connect the positive electrode and the negative electrode of adjacent power storage devices 11, and a first protector 25 for holding the first output bus bar 22 are attached to the power storage device group 12.

The connection bus bars 21, the first output bus bar 22, and the second output bus bar 23 are obtained by pressing metal plate materials into predetermined shapes. As the metal used to form the connection bus bars 21, any metal can be selected such as copper, a copper alloy, stainless steel (SUS), or aluminum. A plating layer made of tin, nickel, or the like may be formed on the surface of the connection bus bars 21.

A connection bus bar 21 has a substantially oblong rectangular shape elongated in the right-left direction as viewed from above. In the connection bus bar 21, a pair of insertion holes 27 that are in communication with the screw holes 16 of the electrodes 15 extend through the connection bus bar 21 in the vertical direction.

Figure 4:
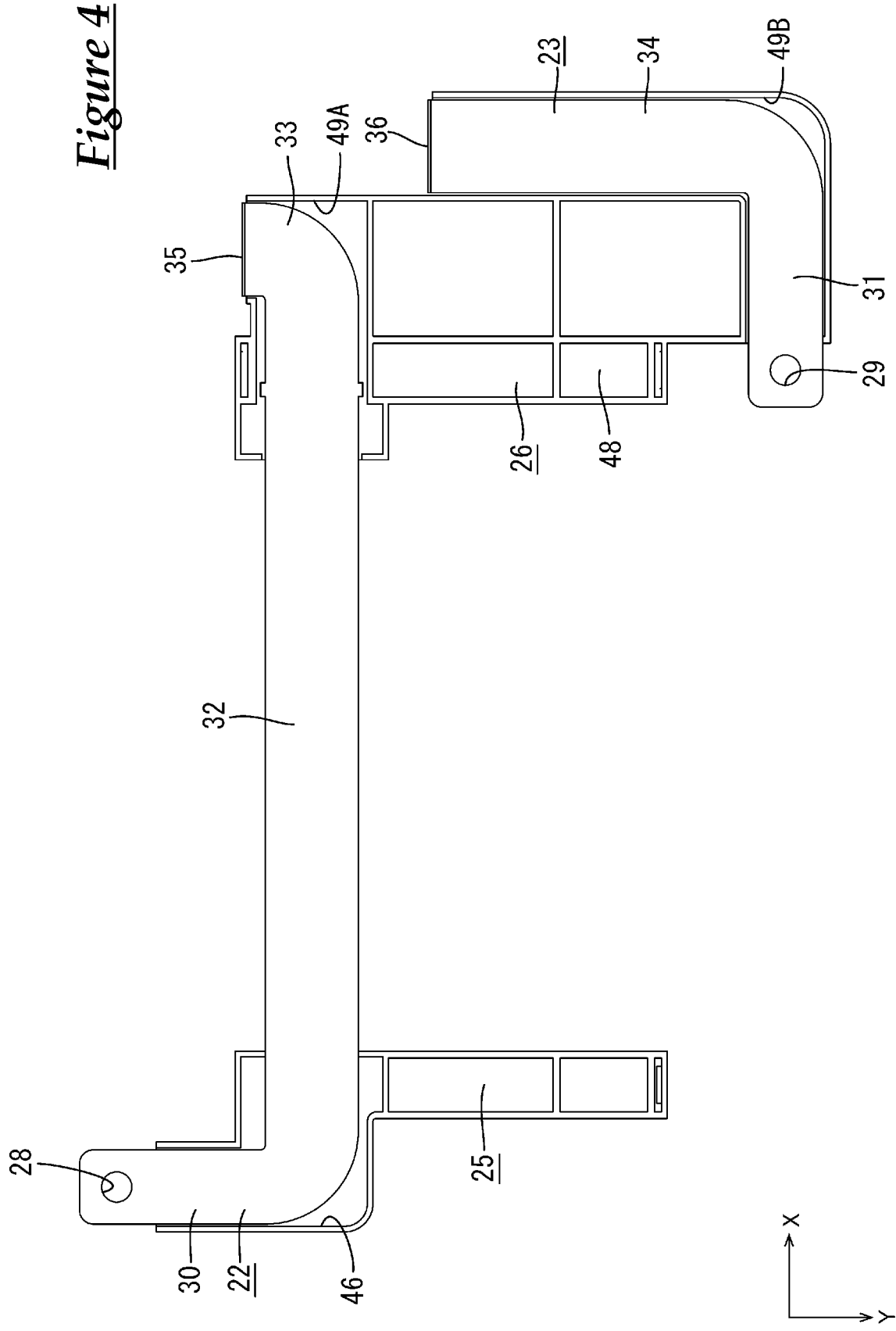
FIG. 4 is a plan view showing a first output bus bar, a second output bus bar, a first protector, and a second protector.

As shown in FIG. 4, the first output bus bar 22 has a shape elongated in the right-left direction as viewed from above. On the left end portion of the first output bus bar 22, an electrode connection portion 30 that extends in the front-rear direction is formed. At a position close to the upper end portion of the electrode connection portion 30, an insertion hole 28 that is in communication with the screw hole 16 of the electrode 15 is formed so as to extend through the electrode connection portion 30 in the vertical direction. On the front end portion of the electrode connection portion 30, a coupling portion 32 elongated in the right direction is formed. On the right end portion of the coupling portion 32, an output portion 33 that is bent rearward and slightly extends rearward is formed. The rear end portion of the output portion 33 forms a bent portion 35 that is bent upward at a right angle. A nut 37 is fixed to the front face of the bent portion 35. The nut 37 is attached to the bent portion 35 by a known means such as press fitting, or welding.

The second output bus bar 23 is substantially L-shaped as viewed from above. The second output bus bar 23 includes an electrode connection portion 31 that extends in the right-left direction. On the left end portion of the electrode connection portion 31, an insertion hole 29 that is in communication with the screw hole 16 of the electrode 15 is formed so as to extend through the electrode connection portion 31 in the vertical direction. On the right end portion of the electrode connection portion 31, an output portion that extends rearward is formed. The rear end portion of the output portion 34 forms a bent portion 36 that is bent upward at a right angle. A nut 38 is fixed to the front face of the bent portion 36. The nut 38 is attached to the bent portion 36 by a known means such as press fitting, or welding.

As shown in FIG. 3, the connection protector 24 is made of an insulating synthetic resin, and is constituted by coupling a plurality of (two in the present embodiment) protector units 39 that are disposed side by side in the right-left direction. One of the two protector units that is positioned on the left side will be referred to as "left protector unit 39A", and the other protector unit that is positioned on the right side will be referred to as "right protector unit 39B". Constituent elements that are common to the left protector unit 39A and the right protector unit 39B will be described generically as protector unit 39.

Holding portions 40 for holding connection bus bars 21 are provided on the front end portion and the rear end portion of the protector unit 39. Each holding portion 40 surrounds a connection bus bar 21. Two holding portions 40 are formed on each of the front end portion and the rear end portion of the protector unit 39. In each holding portion 40, a connection bus bar 21 is held.

An intermediate coupling portion 42 is formed between the holding portions 40 provided on the front end portion of the protector unit 39 and the holding portions 40 provided on the rear end portion of the same. In other words, the holding portions 40 provided on the front end portion of the protector unit 39 and the holding portions 40 provided on the rear end portion of the same are coupled by the intermediate coupling portion 42.

The holding portions 40 formed on the rear end portion of the protector unit 39 and the holding portions 40 formed on the front end portion of the same are disposed such that the holding portions 40 formed on the front end portion are offset toward the left by a width dimension corresponding to one power storage device 11 in the right-left direction.

In the intermediate coupling portion 42 of the protector unit 39, window portions 43 that extend through the intermediate coupling portion 42 in the vertical direction are formed at positions corresponding to the latching holes 17 of the power storage devices 11, with the connection protector 24 being attached to the power storage device group 12. The window portions 43 have a substantially rectangular shape as viewed from above. From the window portions 43, the latching holes 17 of the power storage devices 11 are exposed.

Coupling projection portions 44 that protrude in the left direction are formed on the rear end portion and the front end portion of the intermediate coupling portion 42 of the right the protector unit 39B. The coupling projection portions 44 have a plate-like shape. On the other hand, in the intermediate coupling portion 42 of the left the protector unit 39A, coupling recess portions 45 for receiving insertion of the coupling projection portions 44 are formed at positions corresponding to the coupling projection portions 44. The coupling projection portions 44 and the coupling recess portions 45 are configured such that they are latched by a latching structure (not shown) when the coupling projection portions 44 are inserted into the coupling recess portions 45.

As shown in FIG. 4, the first protector 25 is made of an insulating synthetic resin, and includes a holding portion 46 for holding the first output bus bar 22. The holding portion 46 surrounds the electrode connection portion 30 of the first output bus bar 22.

A latching portion (not shown) that protrudes downward is provided on the lower end portion of the first protector 25. The latching portion (not shown) is configured to be inserted into a lower-side latching hole 17A formed in the second power storage device 11 from the left of the power storage device group 12 from above when the first protector 25 is attached to the power storage device group 12. The latching portion (not shown) is configured to be latched onto a front-side overhanging portion 18 of the latching hole 17A from below. With this configuration, the first protector 25 is prevented from being detached upward from the power storage device group 12.

The second protector 26 is made of an insulating synthetic resin, and includes a first holding portion 49A for holding the first output bus bar 22, and a second holding portion 49B for holding the second output bus bar 23.

The first holding portion 49A surrounds the output portion 33 of the first output bus bar 22. The bent portion 35 is configured to be exposed on the rear side from a region corresponding to the bent portion 35 of the first output bus bar 22. Also, the coupling portion 32 is configured to extend in the left direction from a region corresponding to the coupling portion 32 of the first output bus bar 22.

The second holding portion 49B is substantially L-shaped as viewed from above. The second holding portion 49B surrounds the second output bus bar 23. The electrode connection portion 31 of the second output bus bar 23 is configured to protrude in the left direction from a portion corresponding to the left end portion of the electrode connection portion 31 of the second output bus bar 23. Also, the bent portion 36 of the second output bus bar 23 is configured to be exposed on the rear side from a region corresponding to the bent portion 36 of the second output bus bar 23.

The first holding portion 49A and the second holding portion 49B are coupled by an intermediate coupling portion 48. The intermediate coupling portion 48 has a substantially oblong rectangular shape as viewed from above.

Figure 5:
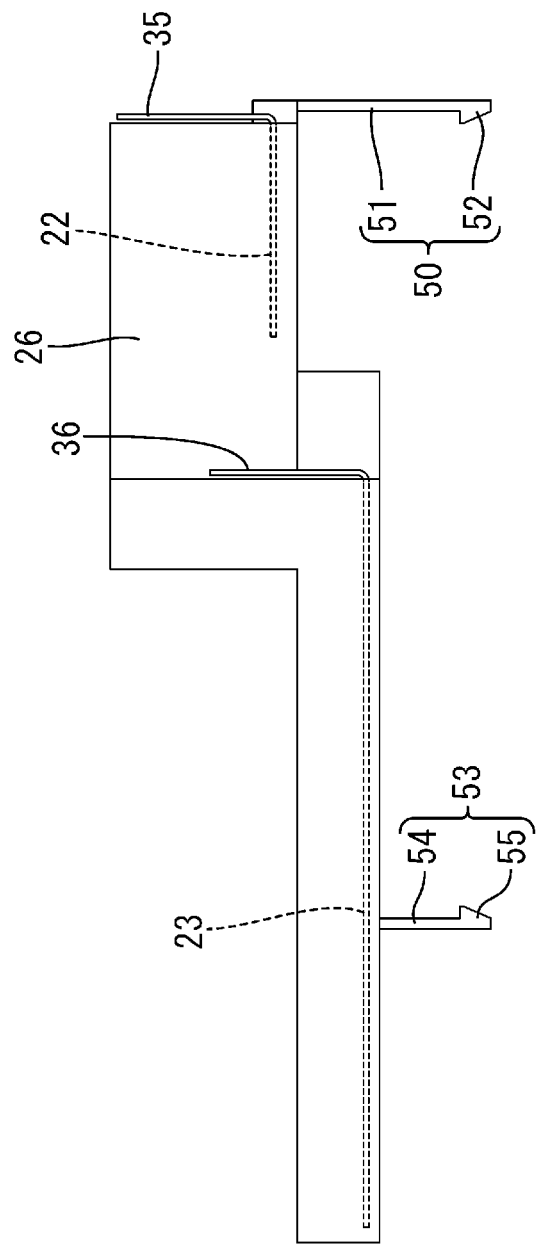
FIG. 5 is a side view of the second protector.

As shown in FIG. 5, at a position that is close to the rear end portion of the second protector 26 and near the center in the right-left direction, a rear-side first latching portion 50 (an example of a latching portion) that protrudes downward is formed. The rear-side first latching portion 50 includes an arm portion 51 that extends downward and is elastically deformable in the front-rear direction, and a latching claw 52 that protrudes frontward from the lower end portion of the arm portion 51.

Figure 10:
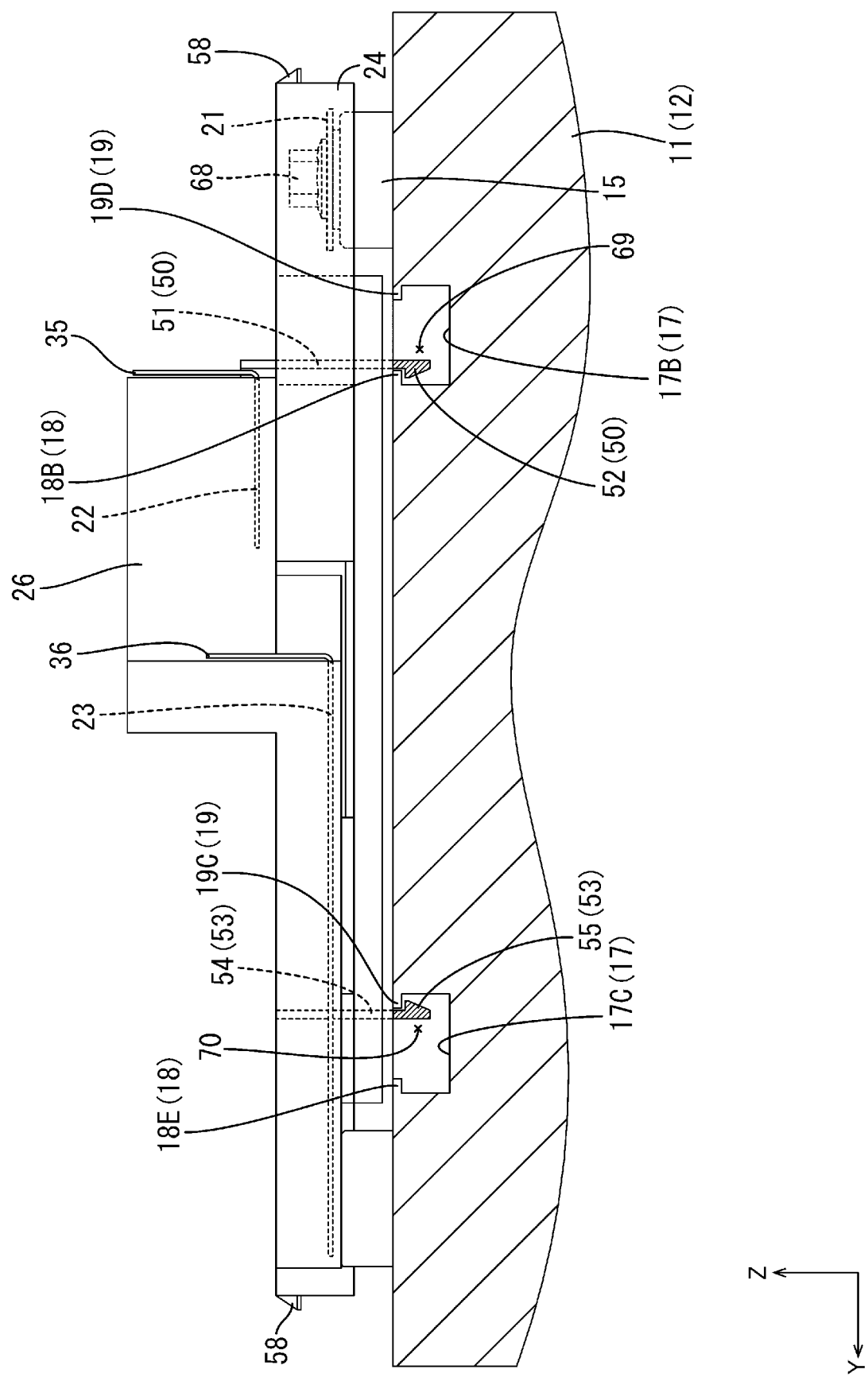
FIG. 10 is a partially cutaway cross-sectional view showing a state in which the second protector has been assembled to the power storage device group.

As shown in FIG. 10, the rear-side first latching portion 50 is configured to be inserted into a rear-side latching hole 17B of a power storage device 11 positioned on the right end portion from above. The latching claw 52 is configured to be latched onto a front-side overhanging portion 18B of the latching hole 17B from below. The front-side overhanging portion 18B of the latching hole 17B functions as a protector latching portion.

In the intermediate coupling portion 42 of the second protector 26, a front-side first latching portion 53 (an example of a latching portion) that protrudes downward is formed at a position close to the left front end portion. The front-side first latching portion 53 includes an arm portion 54 that extends downward and is elastically deformable in the front-rear direction, and a latching claw 55 that protrudes rearward from the lower end portion of the arm portion 54.

As shown in FIG. 10, the front-side first latching portion 53 is configured to be inserted into a front-side latching hole 17C of a power storage device 11 positioned on the right end portion from above. The latching claw 55 is configured to be latched onto a rear-side overhanging portion 19C of the latching hole 17C from below. The rear-side overhanging portion 19C of the latching hole 17C functions as a protector latching portion.

As a result of the rear-side first latching portion 50 being latched onto the front-side overhanging portion 18B of the latching hole 17B, and the front-side first latching portion 53 being latched onto the rear-side overhanging portion 19C of the latching hole 17C, the second protector 26 is prevented from being detached upward from the power storage device group 12.

Figure 6:
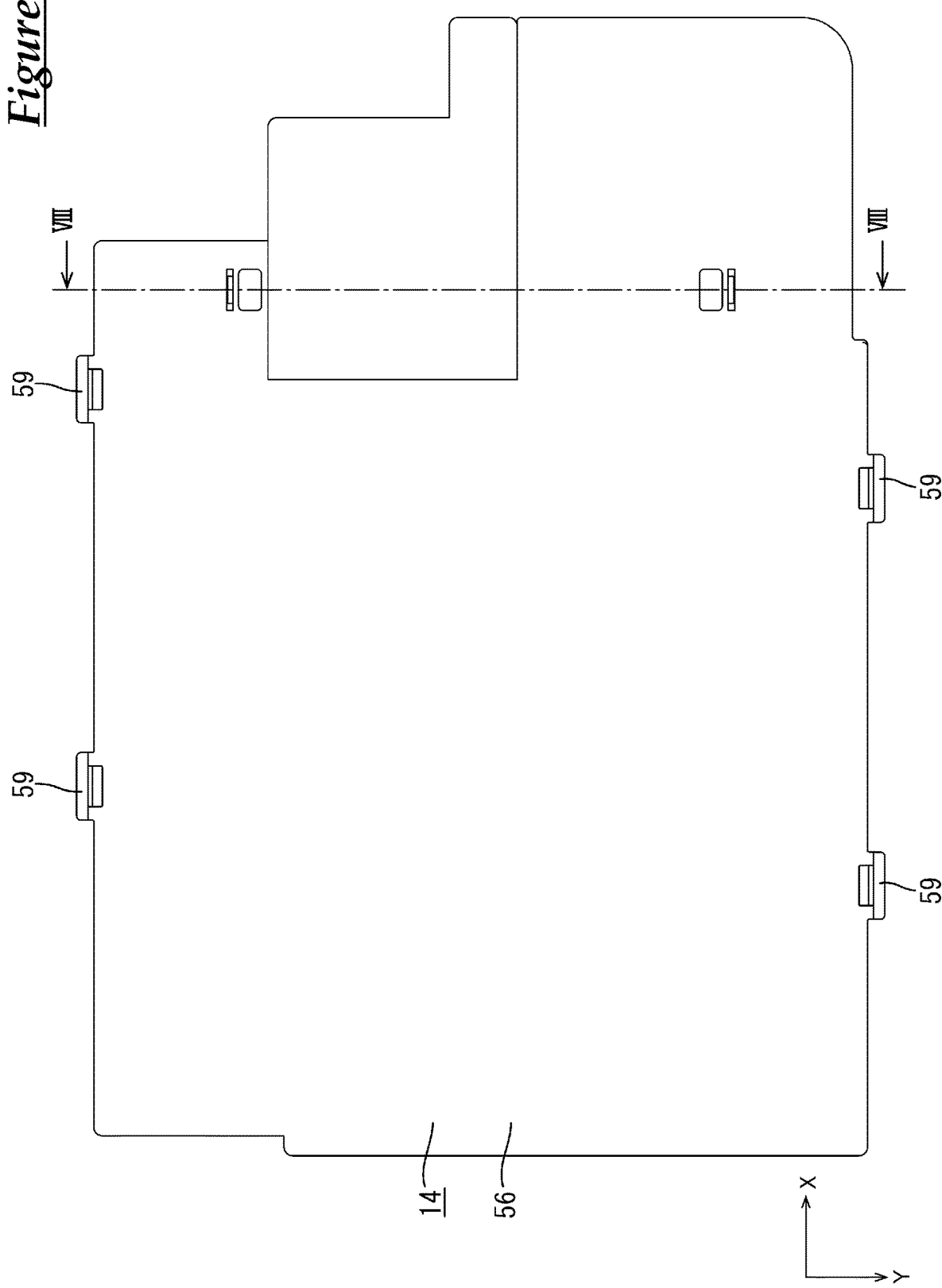
FIG. 6 is a plan view of a cover.
Figure 7:
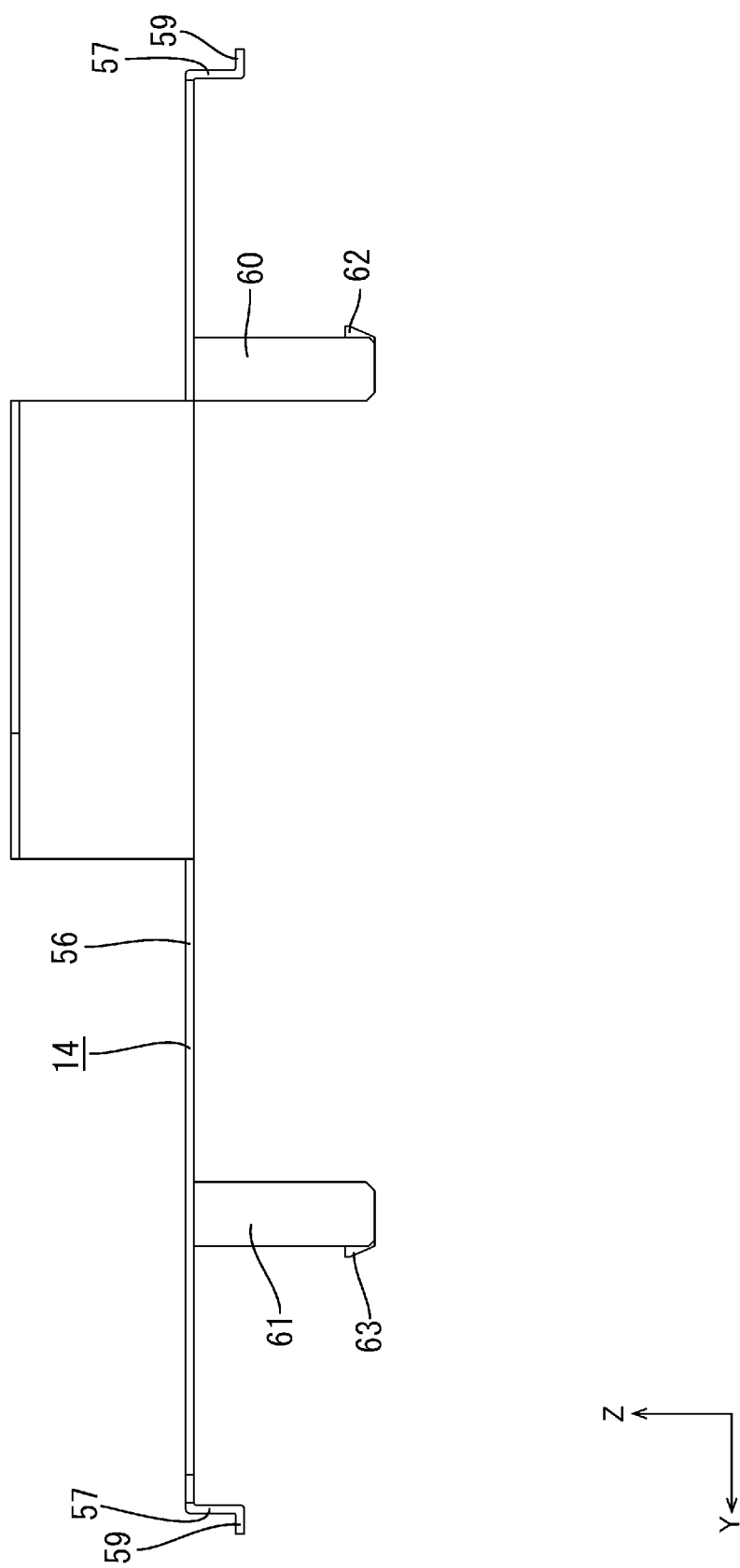
FIG. 7 is a side view of the cover.
Figure 8:
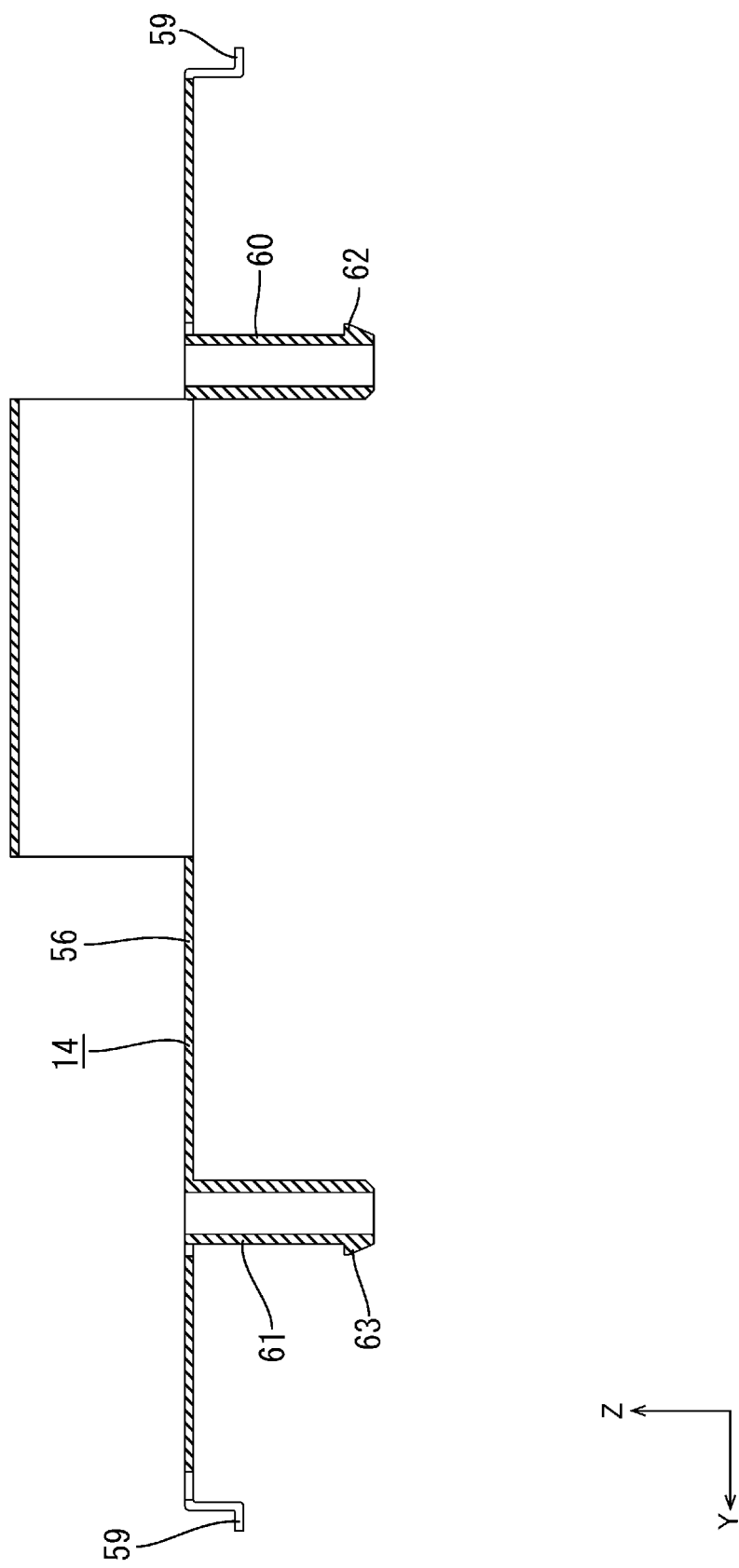
FIG. 8 is a cross-sectional view taken along the line VIII-VIII shown in FIG. 6.

As shown in FIGS. 6 to 8, the cover 14 is made of an insulating synthetic resin, and includes an upper wall 56, and side walls 57 that extend downward from the side edges of the upper wall 56. A plurality of locking portions 58 that protrude frontward or rearward are formed in the connection protector 24 described above. As shown in FIG. 7, in each side wall 57 of the cover 14, a lock receiving portion 59 that is elastically latched onto a locking portion 58 is formed at a position corresponding to the locking portion 58. As a result of the lock receiving portions 59 being elastically latched onto the locking portions 58, the cover 14 is integrally assembled to the connection protector 24.

In a state in which the connection protector 24, the first protector 25, and the second protector 26 are assembled with respect to the power storage devices 11, the cover 14 is configured to be assembled to the connection protector 24 from above. The upper wall 56 of the cover 14 is configured to cover the connection protector 24, the first protector 25, and the second protector 26 from above in a state in which the cover 14 is assembled to the connection protector 24. With this configuration, the connection bus bars 21, the first output bus bar 22, and the second output bus bar 23 are covered by the cover 14 from above.

In a state in which the cover 14 is assembled to the connection protector 24, a rear-side restraining portion 60 and a front-side restraining portion 61 that extend downward from the upper wall 56 of the cover 14 are formed respectively at positions corresponding to the latching hole 17B and the latching hole 17C of the power storage device 11. The rear-side restraining portion 60 is provided at a position close to the right rear end portion of the cover 14, and the front-side restraining portion 61 is provided at a position close to the right front end portion of the cover 14.

The rear-side restraining portion 60 and the front-side restraining portion 61 each have a rectangular tube shape that is open in the vertical direction. A rear-side second latching portion 62 that protrudes rearward is formed at the lower end portion of the rear wall of the rear-side restraining portion 60. The rear-side second latching portion 62 is configured to be latched onto a rear-side overhanging portion 19D of the latching hole 17B of the power storage device 11 from below. The rear-side overhanging portion 19D of the latching hole 17B functions as a cover-side latching portion. Also, a front-side second latching portion 63 that protrudes frontward is formed at the lower end portion of the front wall of the front-side restraining portion 61. The front-side second latching portion 63 is configured to be latched onto a front-side overhanging portion 18E of the latching hole 17C of the power storage device 11 from below. The front-side overhanging portion 18E of the latching hole 17C functions as a cover-side latching portion.

As described above, as a result of the rear-side second latching portion 62 of the rear-side restraining portion 60 being latched onto the rear-side overhanging portion 19D of the latching hole 17B of the power storage device 11, and the front-side second latching portion 63 of the front-side restraining portion 61 being latched onto the front-side overhanging portion 18E of the latching hole 17C of the power storage device 11, the cover 14 is prevented from being detached upward from the power storage device group 12. In other words, the cover 14 is assembled to both the connection protector 24 and the power storage device group 12.

Figure 2:
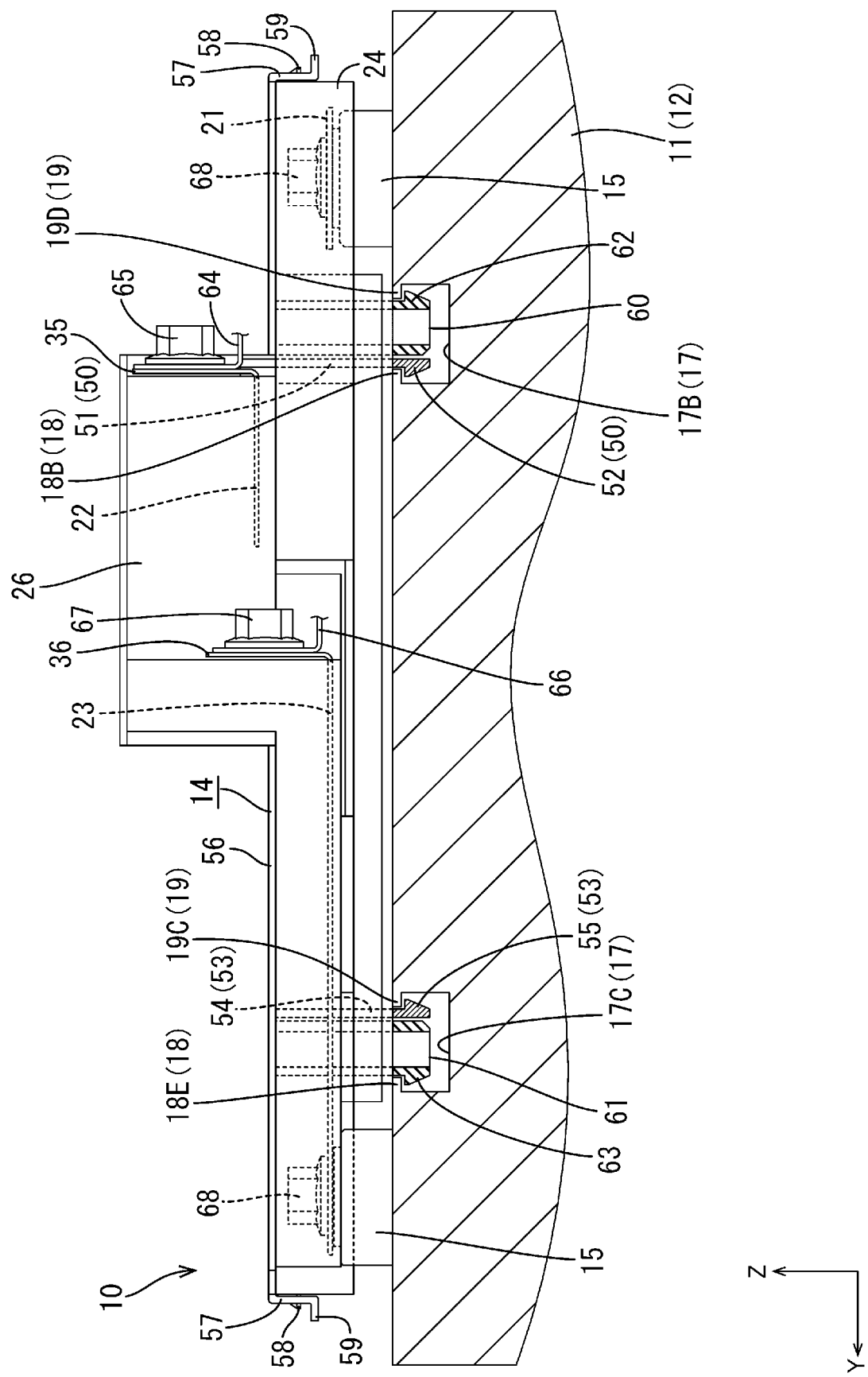
FIG. 2 is a cross-sectional view taken along the line II-II shown in FIG. 1.

As shown in FIG. 2, the rear-side restraining portion 60 is configured to be positioned behind the rear-side first latching portion 50 of the second protector 26 in a state in which the rear-side restraining portion 60 is inserted into the latching hole 17B of the power storage device 11 from above. With this configuration, the rear-side first latching portion 50 is restrained from being elastically deformed rearward. As a result, the engagement of the latching claw 52 of the rear-side first latching portion 50 and the front-side overhanging portion 18B of the latching hole 17B is restrained from being disengaged.

Likewise, the front-side restraining portion 61 is configured to be positioned in front of the front-side first latching portion 53 of the second protector 26 in a state in which the front-side restraining portion 61 is inserted in the latching hole 17C of the power storage device 11 from above. With this configuration, the front-side first latching portion 53 is restrained from being elastically deformed frontward. As a result, the engagement of the latching claw 55 of the front-side first latching portion 53 and the rear-side overhanging portion 19C of the latching hole 17C is restrained from being disengaged.

As described above, the latching hole 17B is provided with the rear-side overhanging portion 19D, and the rear-side restraining portion 60 is provided with the rear-side second latching portion 62 that is latched onto the rear-side overhanging portion 19D. Likewise, the latching hole 17C is provided with the front-side overhanging portion 18E, and the front-side restraining portion 61 is provided with the front-side second latching portion 63 that is latched onto the front-side overhanging portion 18E.

With the configuration described above, the rear-side second latching portion 62 of the rear-side restraining portion 60 is latched to the power storage device 11, and the front-side second latching portion 63 of the front-side restraining portion 61 is latched to the power storage device 11, as a result of which the power storage device 11 and the cover 14 are latched. Accordingly, the cover 14 is latched onto the power storage device 11.

Also, the front-side overhanging portion 18B of the latching hole 17B is configured to latch the rear-side first latching portion 50, and the rear-side overhanging portion 19D of the latching hole 17B is configured to latch the rear-side restraining portion 60. Also, the rear-side overhanging portion 19C of the latching hole 17C is configured to latch the front-side first latching portion 53, and the front-side overhanging portion 18E of the latching hole 17C is configured to latch the front-side restraining portion 61.

With the configuration described above, the second protector 26 and the cover 14 can be latched using the hole edge portions of the latching holes 17. Accordingly, the structure of the power storage module 10 can be simplified compared with the case where a member for latching the second protector 26 and a member for latching the cover 14 are separately prepared.

Bolt Fastening Structure

As shown in FIG. 2, a first external bus bar 64 is fixed to the bent portion 35 of the first output bus bar 22 with a bolt 65. The first external bus bar 64 is made of a metal such as copper or a copper alloy, and is connected to an external device (not shown). As a result of the bolt 65 being screwed into the nut 37 fixed to the bent portion 35, the bent portion 35 of the first output bus bar 22 and the first external bus bar 64 are connected.

A second external bus bar 66 is fixed to the bent portion 36 of the second output bus bar 23 with a bolt 67. The second external bus bar 66 is made of a metal such as copper or a copper alloy, and is connected to an external device (not shown). As a result of the bolt 67 being screwed into the nut 38 fixed to the bent portion 36, the bent portion 36 of the second output bus bar 23 and the second external bus bar 66 are connected.

Example of Manufacturing Process of Embodiment

Next, an example of a manufacturing process according to the present embodiment will be described. However, the process of manufacturing a power storage module 10 is not limited to the following description.

A plurality of power storage devices 11 are lined up in the right-left direction such that the polarities of adjacent electrodes 15 are opposite, and thereby a power storage device group 12 is formed.

Connection bus bars 21 are assembled to the holding portions 40 of a left the protector unit 39A and a right the protector unit 39B. After that, the coupling projection portions 44 of the right the protector unit 39B are inserted into the coupling recess portions 45 of the left the protector unit 39A so as to couple the right the protector unit 39B and the left the protector unit 39A. A connection protector 24 is thereby formed.

Figure 9:
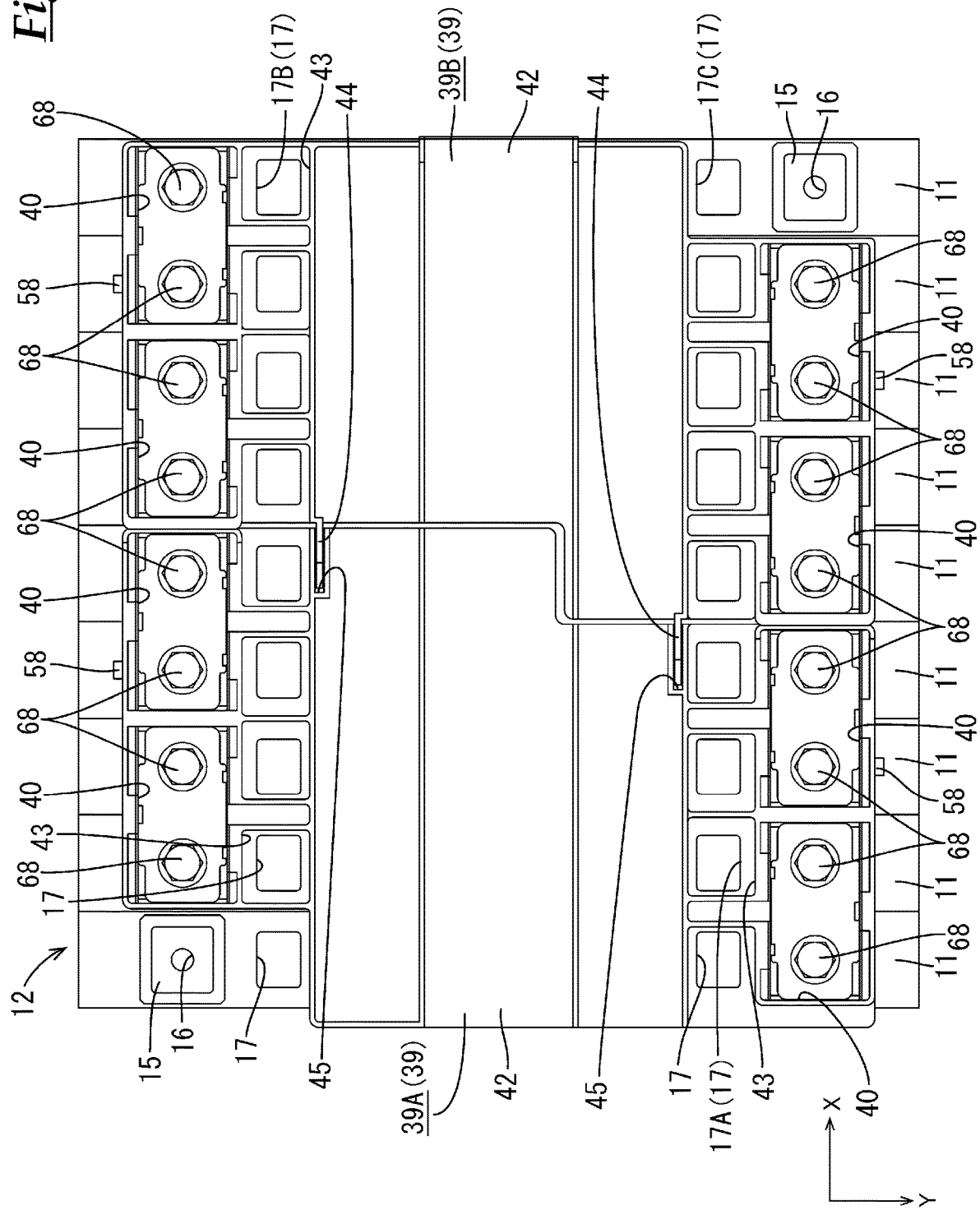
FIG. 9 is a plan view showing a state in which bolts are screwed into screw holes of electrodes after the connection protector has been assembled to the power storage device group.

As shown in FIG. 3, the connection protector 24 is assembled to the power storage device group 12 from above. Next, as shown in FIG. 9, bolts 68 are inserted into the insertion holes 27 of the connection bus bars 21, and screwed into the screw holes 16 of the electrodes 15. The connection bus bars 21 and the electrodes 15 of the power storage devices 11 are thereby connected.

Next, as shown in FIG. 11, a first protector 25 is assembled to the power storage device group 12 from above. The latching portion of the first protector 25 abuts the front-side overhanging portion 18 of the latching hole 17 from below. The first protector 25 is thereby assembled to the power storage device group 12.

Next, as shown in FIG. 11, a second protector 26 is assembled to the power storage device group 12 from above. At this time, as shown in FIG. 10, the latching claw 52 of the rear-side first latching portion 50 of the second protector 26 abuts the front-side overhanging portion 18B of the latching hole 17B from above, and is elastically deformed rearward and then deformed back into its original shape. As a result, the latching claw 52 of the rear-side first latching portion 50 abuts the front-side overhanging portion 18B of the latching hole 17B from below. A space provided behind the rear-side first latching portion 50 is a deflection space 69 for the rear-side first latching portion 50.

On the other hand, the latching claw 55 of the front-side first latching portion 53 abuts the rear-side overhanging portion 19C of the latching hole 17C from above, and is elastically deformed frontward and then deformed back into its original shape. As a result, the latching claw 55 of the front-side first latching portion 53 abuts the rear-side overhanging portion 19C of the latching hole 17C from below.

A space provided in front of the front-side first latching portion 53 is a deflection space 70 for the front-side first latching portion 53.

In this way, the second protector 26 is assembled to the power storage device group 12.

FIG. 4 shows a configuration in which the first protector 25 and the second protector 26 are integrally formed via a first output bus bar 22. However, this is merely an example provided to illustrate a configuration of the first output bus bar 22, the first protector 25, and the second protector 26. Accordingly, the present invention is not limited to a configuration in which the first protector 25 and the second protector 26 are integrally formed via the first output bus bar 22.

A first output bus bar 22 is assembled, from above, to the first protector 25 and the second protector 26 that have been assembled to the power storage devices 11. Also, a second output bus bar 23 is assembled to the second protector 26 from above.

After that, a bolt 68 is inserted into the insertion hole 28 of the first output bus bar 22, and screwed into the screw hole 16 of an electrode 15 so as to connect the first output bus bar 22 and the electrode of the power storage device 11.

Also, a bolt 68 is inserted into the insertion hole 29 of the second output bus bar 23, and screwed into the screw hole 15 of an electrode 15 so as to connect the second output bus bar 23 and the electrode 15 of the power storage device 11 (see FIG. 11).

Next, as shown in FIG. 1, a cover 14 is assembled, from above, to an assembly in which the connection protector 24, the first protector 25, and the second protector 26 have been assembled to the power storage device group 12.

The lock receiving portions 59 of the cover 14 abut the locking portions 58 of the connection protector 24 from above, and are elastically deformed. In response to the cover 14 being further pressed, the lock receiving portions 59 are deformed back into their original shape, and engage with the locking portions 58. The cover 14 and the connection protector 24 are thereby assembled together.

Also, the rear-side restraining portion 60 of the cover 14 abuts the rear-side overhanging portion 19D of the latching hole 17B of the power storage device group 12 from above, and is elastically deformed and then deformed back into its original shape, as a result of which the rear-side second latching portion 62 of the rear-side restraining portion 60 abuts the rear-side overhanging portion 19D of the latching hole 17B from below. At this time, the rear-side restraining portion 60 is positioned within the deflection space 69 for the rear-side first latching portion 50, and restrains elastic deformation of the rear-side first latching portion 50 (see FIG. 2).

Likewise, the front-side restraining portion 61 of the cover 14 abuts the front-side overhanging portion 18E of the latching hole 17C of the power storage device group 12 from above, and is elastically deformed and then deformed back into its original shape, as a result of which the front-side second latching portion 63 of the front-side restraining portion 61 abuts the front-side overhanging portion 18E of the latching hole 17C from below. At this time, the front-side restraining portion 61 is positioned within the deflection space 70 for the front-side first latching portion 53, and restrains elastic deformation of the front-side first latching portion 53 (see FIG. 2).

After that, as shown in FIG. 2, a first external bus bar 64 is placed on the bent portion 35 of the first output bus bar 22 from the rear side, and the first output bus bar 22 and the first external bus bar 64 are fixed with a bolt 65. Likewise, a second external bus bar 66 is placed on the bent portion 36 of the second output bus bar 23 from the rear side, and the second output bus bar 23 and the second external bus bar 66 are fixed with a bolt 67. Through the above process, a power storage module 10 is obtained.

Operations and Advantageous Effects of Embodiment 1

Next, the operations and advantageous effects of the present embodiment will be described. The present embodiment relates to a wiring module 20 that is attached to a power storage module 10 that includes a plurality of power storage devices 11 that include electrodes 15, the wiring module 20 including: a second protector 26 that includes a first output bus bar 22 and a second output bus bar 23 that are connected to the electrodes 15, and is made of an insulating material; and a cover 14 that covers the first output bus bar 22 and the second output bus bar 23. The second protector 26 is provided with a rear-side first latching portion 50 that is latched into a latching hole 17B formed in the power storage module 10 and a front-side first latching portion 53 that is latched into a latching hole 17C formed in the power storage module 10. The cover 14 is provided with a rear-side restraining portion 60 that is disposed within a deflection space 69 for the rear-side first latching portion 50, and restrains elastic deformation of the rear-side first latching portion 50, and a front-side restraining portion 61 that is disposed within a deflection space 70 for the front-side first latching portion 53, and restrains elastic deformation of the front-side first latching portion 53.

With the configuration described above, even if a force is applied to the second protector 26, the rear-side first latching portion 50 and the front-side first latching portion 53 are restrained from being elastically deformed in a direction that they are unlatched from the latching hole 17B and the latching hole 17C. Accordingly, it is possible to reliably latch the second protector 26 to the power storage device 11.

Also, according to the present embodiment, as bus bars, a first external bus bar 64 is attached to the first output bus bar 22 with a bolt 65, and a second external bus bar 66 is attached to the second output bus bar 23 with a bolt 67.

With the configuration described above, even if a force is applied to the second protector 26 via the first output bus bar 22 or the second output bus bar 23 when the bolt 65 is attached to the first external bus bar 64 and the first output bus bar 22, or when the bolt 67 is attached to the second external bus bar 66 and the second output bus bar 23, it is possible to keep the rear-side first latching portion 50 and the front-side overhanging portion 18B from being unlatched, and also keep the front-side first latching portion 53 and the rear-side overhanging portion 19C from being unlatched.

According to the present embodiment, the rear-side restraining portion 60 and the front-side restraining portion 61 each have a rectangular tube shape.

With the configuration described above, the rear-side restraining portion 60 and the front-side restraining portion 61 have a shape that is less deformable. Accordingly, it is possible to reliably restrain elastic deformation of the rear-side first latching portion 50 and the front-side first latching portion 53.

Embodiment 2

Next, Embodiment 2 in which a technique disclosed in this specification is applied to a power storage module 110 will be described with reference to FIGS. 12 to 17.

Figure 12:
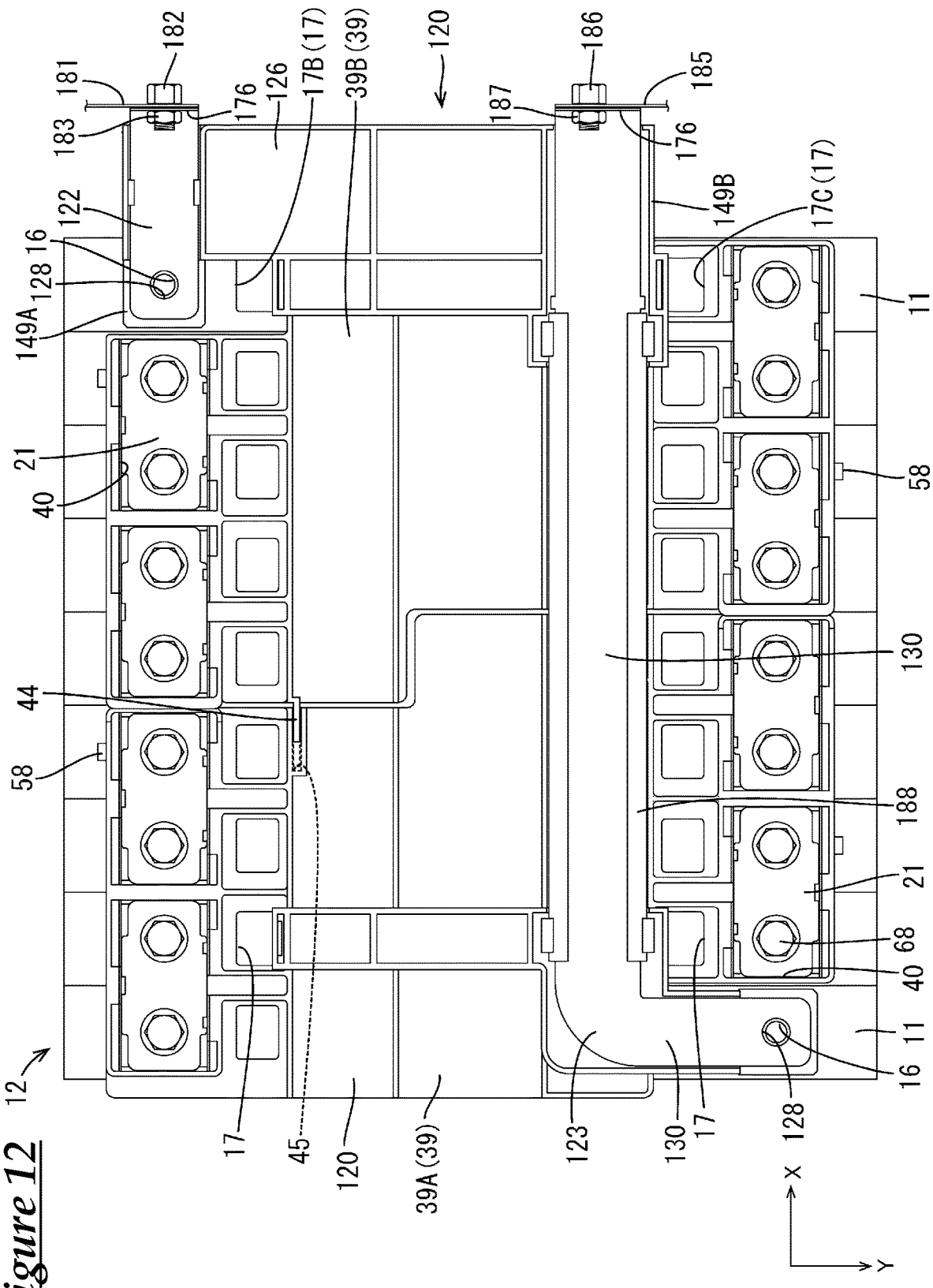
FIG. 12 is a plan view of a power storage module according to Embodiment 2, from which a cover has been removed.

As shown in FIG. 12, a wiring module 120 is attached to a power storage device group 12. The wiring module 120 includes a first output bus bar 122 (an example of a bus bar) that is connected to a rear-side electrode 15 of a power storage device 11 that is positioned on the right end of the power storage device group 12, a second output bus bar 123 (an example of a bus bar) that is connected to a front-side electrode 15 of a power storage device 11 that is positioned on the left end of the power storage device group 12, an output protector 126 (an example of a protector) that holds the first output bus bar 122 and the second output bus bar 123, and a cover 114 that covers the first output bus bar 122 and the second output bus bar 123.

As shown in FIG. 12, the first output bus bar 122 has a shape elongated in the right-left direction as viewed from above. An insertion hole 128 that is in communication with a screw hole 16 of an electrode 15 extends through the left end portion of the first output bus bar 122 in the vertical direction. A fastening portion 175 that is bent upward at a right angle is formed at the right end portion of the first output bus bar 122. A through hole 180 that extends through the fastening portion 175 in the right-left direction is formed in the fastening portion 175. An external terminal 181 is placed on the fastening portion 175, and fixed with a bolt 182 and a nut 183. The bolt 182 is inserted through the through hole 180.

The second output bus bar 123 is substantially L-shaped as viewed from above. On the left end portion of the second output bus bar 123, an electrode connection portion 130 that extends in the front-rear direction is formed. At a position close to the lower end portion of the electrode connection portion 130, an insertion hole 128 that is in communication with a screw hole 16 of an electrode 15 extends through the electrode connection portion 130 in the vertical direction. A coupling portion 132 that is elongated in the right direction is formed at the rear end portion of the electrode connection portion 130. At the right end portion of the coupling portion 132, a fastening portion 176 that is bent upward at a right angle is formed. A through hole 184 that extends through the fastening portion 176 in the right-left direction is formed in the fastening portion 176. An external terminal 185 is placed on the fastening portion 176, and fixed with a bolt 186 and a nut 187. The bolt 186 is inserted through the through hole 184.

In the coupling portion 132 of the second output bus bar 123, a protection member 188 that is made of an insulating synthetic resin is fitted over the lower surface and side edges of the coupling portion 132. The lower surface and side edge of the second output bus bar 123 are insulated from the power storage device group 12 by the protection member 188.

The output protector 126 is made of an insulating synthetic resin, and includes a first holding portion 149A for holding the first output bus bar 122, and a second holding portion 149B for holding the second output bus bar 123.

The first holding portion 149A surrounds the first output bus bar 122. The fastening portion 175 is exposed on the right side from a region corresponding to the fastening portion 175 of the first output bus bar 122.

The second holding portion 149B is substantially L-shaped as viewed from above. The second holding portion 149B surrounds the second output bus bar 123. The fastening portion 176 of the second output bus bar 123 is exposed on the right side from a region corresponding to the fastening portion 176 of the second output bus bar 123.

Figure 13:
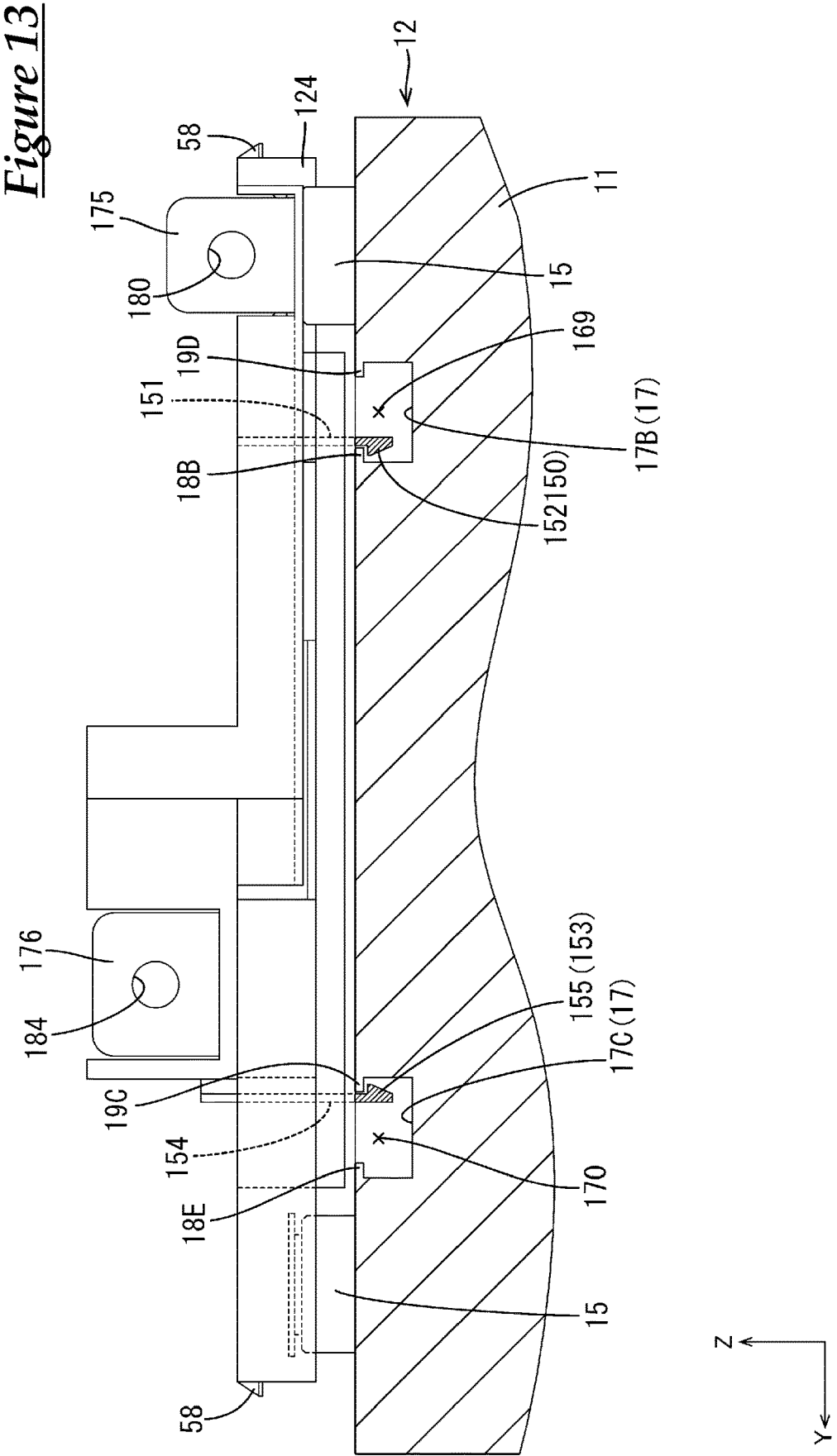
FIG. 13 is a side view showing a state in which a connection protector has been assembled to a power storage device group.

As shown in FIG. 13, at a position close to the rear end portion of the output protector 126, a rear-side first latching portion 150 (an example of a latching portion) that protrudes downward is formed. The rear-side first latching portion 150 includes an arm portion 151 that extends downward and is elastically deformable in the front-rear direction, and a latching claw 152 that protrudes frontward from the lower end portion of the arm portion 151.

As shown in FIG. 13, the rear-side first latching portion 150 is configured to be inserted, from above, into a rear-side latching hole 17B of the power storage device 11. The latching claw 152 is configured to be latched onto a front-side overhanging portion 18B of the latching hole 17B from below. The front-side overhanging portion 18B of the latching hole 17B functions as a protector latching portion.

At a position close to the front end portion of the output protector 126, a front-side first latching portion 153 (an example of a latching portion) that protrudes downward is formed. The front-side first latching portion 153 includes an arm portion 154 that extends downward and is elastically deformable in the front-rear direction, and a latching claw 155 that protrudes rearward from the lower end portion of the arm portion 154.

As shown in FIG. 13, the front-side first latching portion 153 is configured to be inserted into a front-side latching hole 17C of the power storage device 11 from above. The latching claw 155 is configured to be latched onto a rear-side overhanging portion 19C of the latching hole 17C from below. The rear-side overhanging portion 19C of the latching hole 17C functions as a protector latching portion.

As a result of the rear-side first latching portion 150 being latched onto the front-side overhanging portion 18B of the latching hole 17B, and the front-side first latching portion 153 being latched onto the rear-side overhanging portion 19C of the latching hole 17C, the output protector 126 is prevented from being detached upward from the power storage device group 12.

Figure 14:
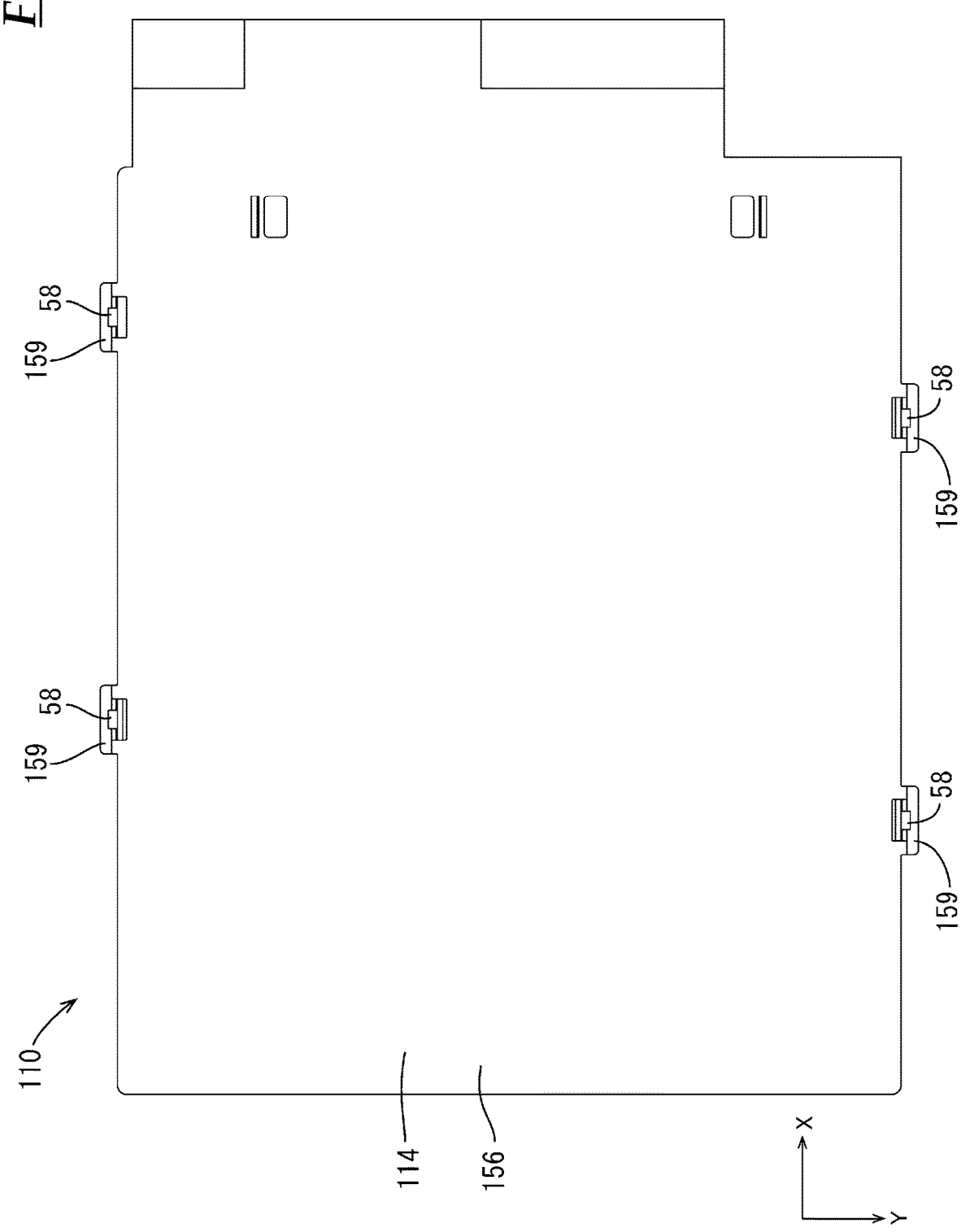
FIG. 14 is a plan view of the power storage module according to Embodiment 2.
Figure 15:
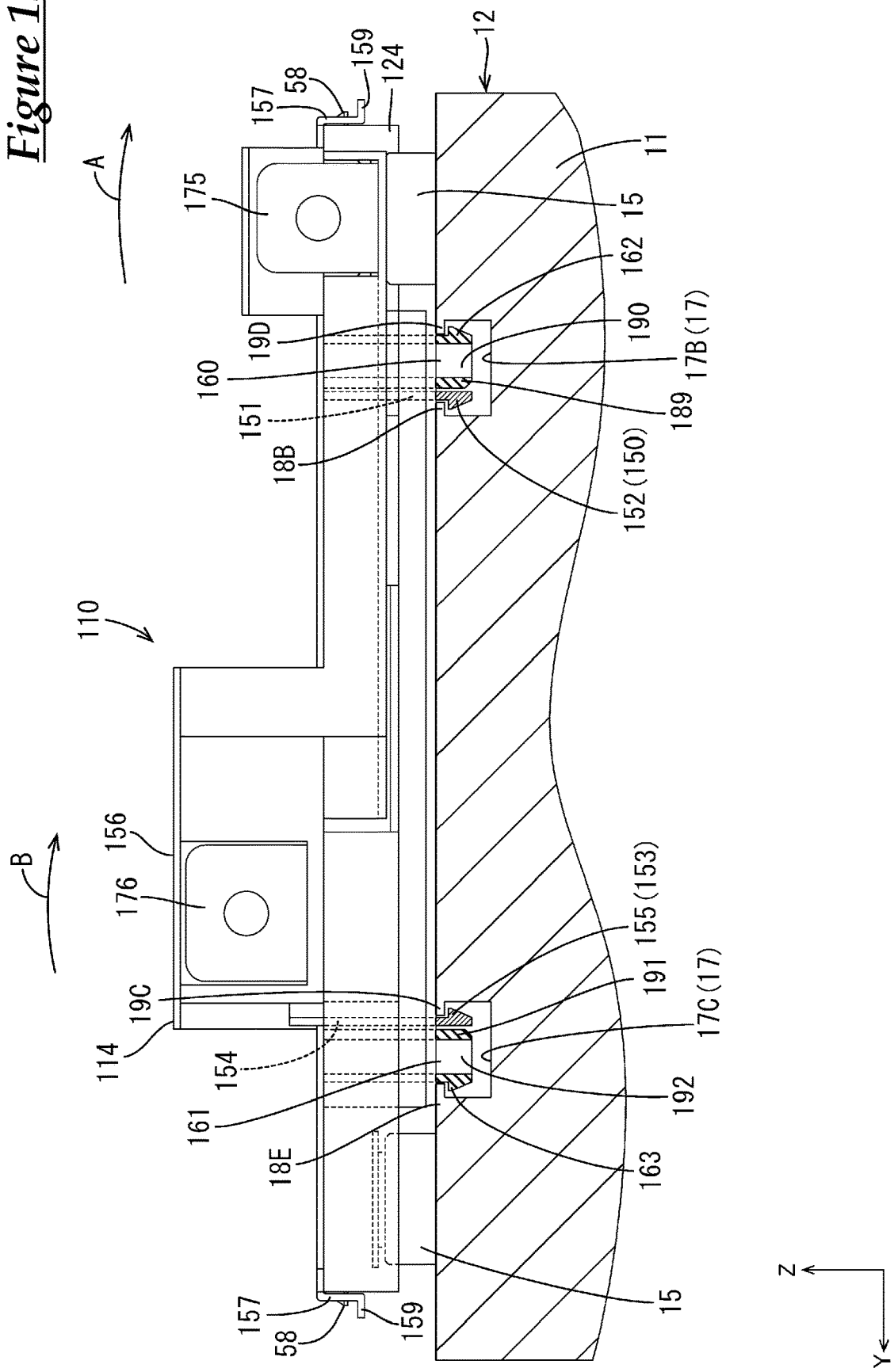
FIG. 15 is a side view of the power storage module according to Embodiment 2.
Figure 16:
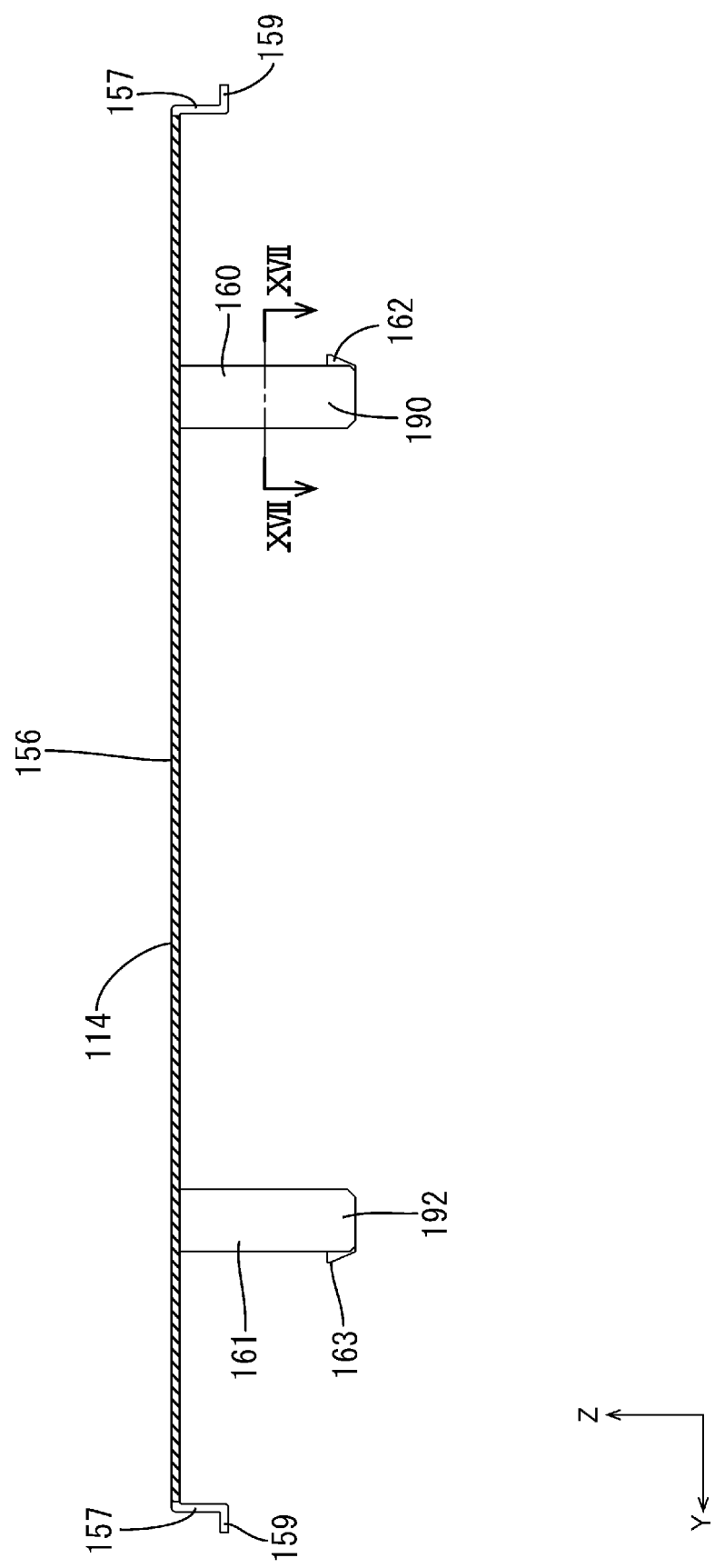
FIG. 16 is a cross-sectional view of a cover.

As shown in FIGS. 14 to 16, the cover 114 is made of an insulating synthetic resin, and includes an upper wall 156, and side walls 157 that extend downward from the side edges of the upper wall 156. As shown in FIG. 14, as a result of lock receiving portions 159 being elastically latched onto locking portions 58, the cover 114 is integrally assembled to a connection protector 24.

The cover 114 is configured to be assembled to the connection protector 24 from above in a state in which the connection protector 24, and the output protector 126 are assembled to the power storage devices 11. The upper wall 156 of the cover 114 is configured to cover the connection protector 24 and the output protector 126 from above in a state in which the cover 114 is assembled to the connection protector 24. With this configuration, connection bus bars 21, the first output bus bar 122, and the second output bus bar 123 are covered by the cover 114 from above.

In a state in which the cover 114 is assembled to the connection protector 24, a rear-side restraining portion 160 and a front-side restraining portion 161 that extend downward from the upper wall 156 of the cover 114 are formed respectively at positions corresponding to the latching hole 17B and the latching hole 17C of the power storage device 11. The rear-side restraining portion 160 is provided at a position close to the rear end portion of the cover 114, and the front-side restraining portion 161 is provided at a position close to the front end portion of the cover 14.

As shown in FIG. 15, a rear-side second latching portion 162 (an example of a cover-side latching portion) that protrudes rearward is formed at the lower end portion of the rear wall of the rear-side restraining portion 160. The rear-side second latching portion 162 is configured to be latched onto a rear-side overhanging portion 19D of the latching hole 17B of the power storage device 11 from below. Likewise, a front-side second latching portion 163 (an example of a cover-side latching portion) that protrudes frontward is formed at the lower end portion of the front wall of the front-side restraining portion 161. The front-side second latching portion 163 is configured to be latched onto a front-side overhanging portion 18E of the latching hole 17C of the power storage device 11 from below.

As described above, as a result of the rear-side second latching portion 162 of the rear-side restraining portion 160 being latched onto the rear-side overhanging portion 19D of the latching hole 17B of the power storage device 11, and the front-side second latching portion 163 of the front-side restraining portion 161 being latched onto the front-side overhanging portion 18E of the latching hole 17C of the power storage device 11, the cover 114 is prevented from being detached upward from the power storage device group 12. In other words, the cover 14 is configured to be assembled to both the connection protector 24 and the power storage device group 12.

As shown in FIG. 15, the rear-side restraining portion 160 is configured to be positioned behind the rear-side first latching portion 150 of the output protector 126 in a state in which the rear-side restraining portion 160 is inserted into the latching hole 17B of the power storage device 11 from above. With this configuration, the rear-side first latching portion 150 is restrained from being elastically deformed rearward. As a result, the engagement of the latching claw 152 of the rear-side first latching portion 150 and the front-side overhanging portion 18B of the latching hole 17B is restrained from being disengaged.

The rear-side restraining portion 160 includes an abutment wall 189 that is positioned behind the rear-side first latching portion 150, and on which the rear-side first latching portion 150 abuts when it is elastically deformed rearward. The abutment wall 189 is formed so as to extend downward from the upper wall 156. A rear face of the abutment wall 189 (the face opposite to the rear-side first latching portion 150) includes a pair of reinforcing walls 190 that extend rearward (in the direction opposite to the rear-side first latching portion 150). The reinforcing walls 190 extend downward from the upper wall 156.

Figure 17:
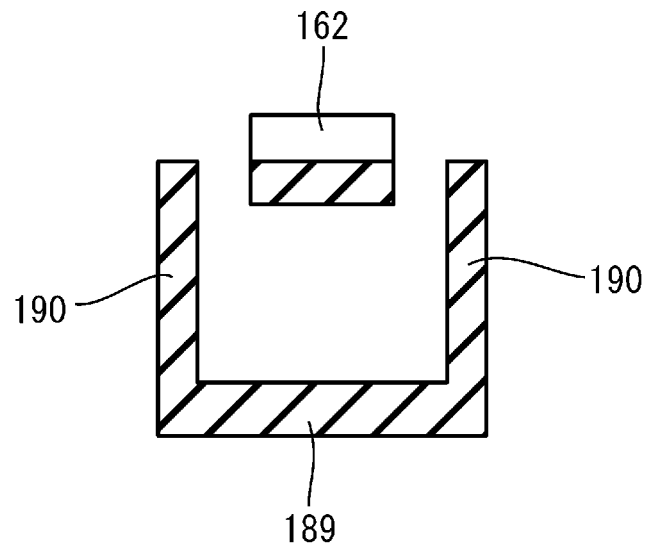
FIG. 17 is a cross-sectional view taken along the line XVII-XVII shown in FIG. 16.

As shown in FIG. 17, the rear-side restraining portion 160 is formed in a substantially rectangular tube shape by the abutment wall 189 and the reinforcing walls 190 that form a C-shaped cross section, and a rear wall of the rear-side restraining portion 160. A gap is formed between the rear wall of the rear-side restraining portion 160 and the reinforcing walls 190 such that the rear wall of the rear-side restraining portion 160 can be easily deflected or deformed.

Also, the front-side restraining portion 161 is configured to be positioned in front of the front-side first latching portion 153 of the output protector 126 in a state in which the front-side restraining portion 161 is inserted into the latching hole 17C of the power storage device 11 from above. With this configuration, the front-side first latching portion 153 is restrained from being elastically deformed frontward. As a result, the engagement of the latching claw 155 of the front-side first latching portion 153 and the rear-side overhanging portion 19C of the latching hole 17C is restrained from being disengaged.

The front-side restraining portion 161 includes an abutment wall 191 that is positioned behind the front-side first latching portion 153, and on which the front-side first latching portion 153 abuts when it is elastically deformed frontward. The abutment wall 191 is formed so as to extend downward from the upper wall 156. A front face of the abutment wall 191 (the face opposite to the front-side first latching portion 153) includes a pair of reinforcing walls 192 that extend in the front direction (in the direction opposite to the front-side first latching portion 153). The reinforcing walls 192 extend downward from the upper wall 156.

The cross-sectional shape of the front-side restraining portion 161 is the same as that of the rear-side restraining portion 160, and thus a description thereof is omitted here.

Bolt Fastening Structure

As shown in FIG. 12, the axis line of the bolt 182 inserted through the through hole 180 of the fastening portion 175, and the axis line of the bolt 186 inserted through the through hole 184 of the fastening portion 176 extend in the right-left direction.

As shown in FIG. 15, the rear-side first latching portion 150 is provided at a position spaced apart from the axis line of the bolt 182 in the radial direction of the bolt 182. When the bolt 182 is rotated in a clockwise direction in FIG. 15 so as to screw the bolt 182 into the nut 183, the twisting force is transferred from the first output bus bar 122 to the output protector 126, and a force in a direction of pulling the rear-side first latching portion 150 upward is thereby applied. At this time, the rear-side restraining portion 160 is positioned in an elastic deflection region for the rear-side first latching portion 150 that is positioned behind the rear-side first latching portion 150.

Likewise, the front-side first latching portion 153 is provided at a position spaced apart from the axis line of the bolt 186 in the radial direction of the bolt 186. When the bolt 186 is rotated in the clockwise direction in FIG. 15 so as to screw the bolt 186 into the nut 187, the twisting force is transferred from the second output bus bar 123 to the output protector 126, and a force in a direction of pulling the front-side first latching portion 153 upward is thereby applied. At this time, the front-side restraining portion 161 is positioned in an elastic deflection region for the front-side first latching portion 153 that is positioned in front of the front-side first latching portion 153.

The constituent elements other than those described above are substantially the same as those of Embodiment 1. Accordingly, the same members are given the same reference numerals, and a redundant description is omitted.

Next, the operations and advantageous effects of the present embodiment will be described.

According to the present embodiment, the rear-side second latching portion 162 that protrudes rearward is formed at the lower end portion of the rear wall of the rear-side restraining portion 160. Likewise, the front-side second latching portion 163 that protrudes frontward is formed at the lower end portion of the front wall of the front-side restraining portion 161. With this configuration, the rear-side restraining portion 160 is fixed by the rear-side second latching portion 162, and the front-side restraining portion 161 is fixed by the front-side second latching portion 163. As a result, it is possible to reliably restrain elastic deformation of the rear-side first latching portion 150 and the front-side first latching portion 153.

According to the present embodiment, the rear-side restraining portion 160 includes the abutment wall 189 that abuts the rear-side first latching portion 150 in a state in which it is disposed within the deflection space 169 for the rear-side first latching portion 150. Likewise, the front-side restraining portion 161 includes the abutment wall 191 that abuts the front-side first latching portion 153 in a state in which it is disposed within the deflection space 170 for the front-side first latching portion 153. With this configuration, the abutment wall 189 abuts the rear-side first latching portion 150, and the abutment wall 191 abuts the front-side first latching portion 153. Accordingly, it is possible to reliably restrain elastic deformation of the rear-side first latching portion 150 and the front-side first latching portion 153.

According to the present embodiment, the reinforcing walls 190 that extend rearward are formed on the rear face of the abutment wall 189. Likewise, the reinforcing walls 192 that extend frontward are formed on the front face of the abutment wall 191. With this configuration, it is possible to restrain the abutment wall 189 from being deflected or deformed when the abutment wall 189 abuts the rear-side first latching portion 150, and also restrain the abutment wall 191 from being deflected or deformed when the abutment wall 191 abuts the front-side first latching portion 153. Accordingly, it is possible to reliably restrain the rear-side first latching portion 150 and the front-side first latching portion 153 from being elastically deformed.

According to the present embodiment, the first output bus bar 122 includes the fastening portion 175 to which the bolt 182 is attached, and the rear-side first latching portion 150 is provided at a position spaced apart from the axis line of the bolt 182 in the radial direction of the bolt 182. Likewise, the second output bus bar 123 includes the fastening portion 176 to which the bolt 186 is attached, and the front-side first latching portion 153 is provided at a position spaced apart from the axis line of the bolt 186 in the radial direction of the bolt 186.

With the configuration described above, when the bolt 182 is rotated in the clockwise direction in FIG. 15 (the direction indicated by the arrow A) so as to screw the bolt 182 into the nut 183, the twisting force is transferred from the first output bus bar 122 to the output protector 126, and a force in a direction of pulling the rear-side first latching portion 150 upward is thereby applied. At this time, due to the principle of leverage, the twisting force increases as it moves away from the axis line of the bolt 182 in the radial direction of the bolt 182. For this reason, when the rear-side first latching portion 150 is provided at a position spaced apart from the axis line of the bolt 182 in the radial direction of the bolt 182, the rear-side first latching portion 150 may be easily unlatched.

In the same manner as described above, when the bolt 186 is rotated in the clockwise direction in FIG. 15 (the direction indicated by the arrow B) so as to screw the bolt 186 into the nut 187, the twisting force is transferred from the second output bus bar 123 to the output protector 126, and a force in a direction of pulling the front-side first latching portion 153 upward is thereby applied. At this time, due to the principle of leverage, the twisting force increases as it moves away from the axis line of the bolt 186 in the radial direction of the bolt 186. For this reason, when the front-side first latching portion 153 is provided at a position spaced apart from the axis line of the bolt 186 in the radial direction of the bolt 186, the front-side first latching portion 153 may be easily unlatched.

The technique according to the present embodiment is effective in the above-described case.

Embodiment 3

Figure 18:
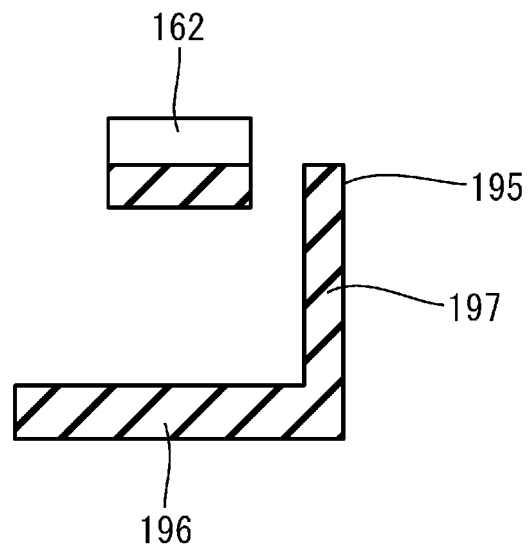
FIG. 18 is a cross-sectional view of a rear-side restraining portion according to Embodiment 3.

Next, Embodiment 3 that is a technique disclosed in this specification will be described with reference to FIG. 18.

In the present embodiment, a rear-side restraining portion 195 includes an abutment wall 196, and a reinforcing wall 197 that extends rearward from a rear face of the abutment wall 196. The abutment wall 196 and the reinforcing wall 197 form a substantially L-shaped cross section.

The constituent elements other than those described above are substantially the same as those of Embodiment 2. Accordingly, the same members are given the same reference numerals, and a redundant description is omitted.

Embodiment 4

Next, Embodiment 4 that is a technique disclosed in this specification will be described with reference to FIG. 19.

Figure 19:
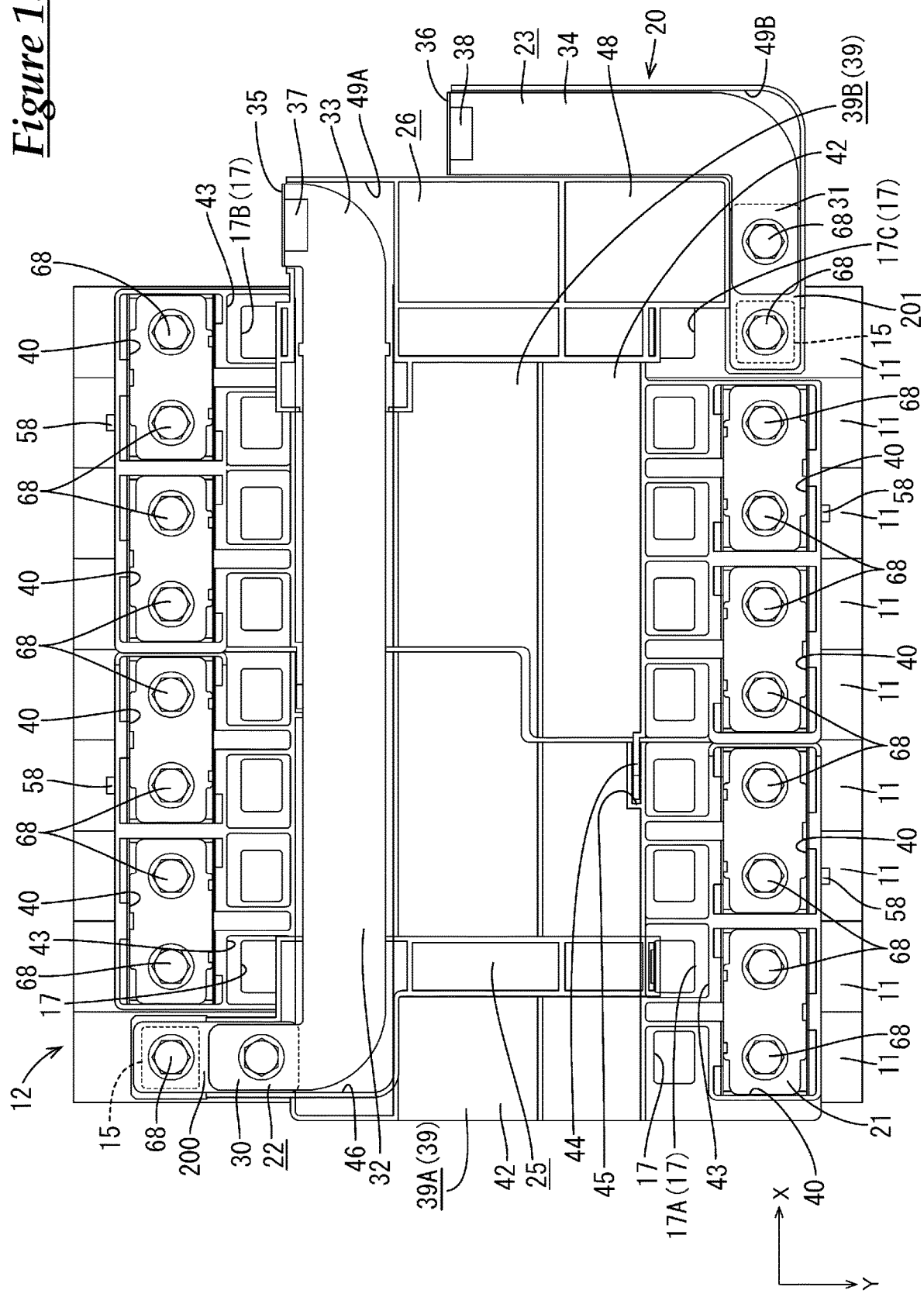
FIG. 19 is a plan view of a power storage module according to Embodiment 4, from which a cover has been removed.

A first output bus bar 22 is connected to an electrode 15 of a power storage device 11 positioned in the left end portion in FIG. 19 via a first sub-bus bar 200. The first sub-bus bar 200 has a substantially oblong rectangular shape as viewed from above. One end portion (rear end portion) of the first sub-bus bar 200 is superimposed on the electrode 15 of the power storage device 11, and connected to the electrode 15, with a bolt 68 being inserted therethrough.

The other end portion (front end portion) of the first sub-bus bar 200 is provided under the left end portion of the first output bus bar 22, and connected to the left end portion of the first output bus bar 22, with a bolt 68 being inserted therethrough.

In other words, the electrode 15 and the first sub-bus bar 200 are connected, and the first sub-bus bar 200 and the first output bus bar 22 are connected. In the other end portion of the first sub-bus bar 200, a nut (not shown) may be provided to the lower surface, or an insertion hole that has undergone so-called burring processing may be formed.

Also, a second output bus bar 23 is connected to an electrode 15 of a power storage device 11 positioned in the right end portion in FIG. 19 via a second sub-bus bar 201. The second sub-bus bar 201 has a substantially oblong rectangular shape as viewed from above. One end portion (left end portion) of the second sub-bus bar 200 is superimposed on the electrode 15 of the power storage device 11, and connected to the electrode 15, with a bolt 68 being inserted therethrough.

The other end portion (right end portion) of the second sub-bus bar 201 is provided under the left end portion of the second output bus bar 23, and connected to the left end portion of the second output bus bar 23, with a bolt 68 being inserted therethrough.

In other words, the electrode 15 and the second sub-bus bar 201 are connected, and the second sub-bus bar 201 and the second output bus bar 23 are connected. In the other end portion of the second sub-bus bar 201, a nut (not shown) may be provided to the lower surface, or an insertion hole that has undergone so-called burring processing may be formed.

The constituent elements other than those described above are substantially the same as those of Embodiment 1. Accordingly, the same members are given the same reference numerals, and a redundant description is omitted.

According to the present embodiment, even if a change is made to the specifications of the structure of the electrode terminals 15 of the power storage device 11, it is possible to easily cope with the change by changing the shapes of the first sub-bus bar 200 and the second sub-bus bar 201. In this case, the first output bus bar 22 can be used commonly even if the specifications of the electrode terminals 15 vary. Also, the second output bus bar 23 can be used commonly even if the specifications of the electrode terminals 15 vary. Accordingly, the manufacturing cost can be reduced.

Other Embodiments

The techniques disclosed in this specification are not limited to the embodiments described above with reference to the drawings. For example, embodiments as described below are also encompassed in the technical scope of the techniques disclosed in this specification.

The power storage devices 11 may be secondary batteries, or capacitors.

The protector latching portion and the cover-side latching portion may be formed in different power storage devices 11.

The cover-side latching portion may be omitted.

One wiring module 20 may include one, two, three, five or more first latching portions.

One cover 14 may include one, three or more second latching portions.

The cover 14 may be attached to the second protector 26 by an arbitrary method such as screwing.

The restraining portions according to the present embodiment have a rectangular tube shape, but the shape is not limited thereto. The restraining portions may have a solid rectangular cylinder shape. Also, the cross-sectional shape of the restraining portions is not limited to a rectangular shape, and may be any shape such as a circular shape, or a triangular shape.

The wiring module 20 may include a detection terminal that is connected to an electrode 15 and detects a state of a power storage device 11, and an electric wire that is connected to the detection terminal.

In the present embodiment, the wiring module 20 is configured to be attached to the power storage device 11. However, the configuration is not limited thereto. The wiring module 20 may be attached to the first protector 25, or may be attached to the connection protector 24. The wiring module 20 can be attached to any member that is attached to the power storage device group 12.

In the present embodiment, the first latching portions are formed on the second protector 26, but the configuration is not limited thereto. The first latching portions may be formed on the first protector 25, or the connection protector 24. Alternatively, the first latching portions may be attached to any member that is attached to the power storage device group 12.

In the present embodiment, the latching holes and the overhanging portions are provided in the upper surface of the power storage device. However, the configuration is not limited thereto, and the latching holes and the overhanging portions may be provided in any member that is attached to the power storage device.

The cross-sectional shape of the abutment walls and the reinforcing walls may be any shape such as a substantially T shape, or a substantially E shape.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10, 110: Power storage module
11: Power storage device
14, 114: Cover
15: Electrode
20, 120: Wiring module
22, 122: First output bus bar (bus bar)
23, 123: Second output bus bar (bus bar)
26: Second protector (protector)
37, 38: Nut
50, 150: Rear-side first latching portion (latching portion)
53, 153: Front-side first latching portion (latching portion)
60, 160: Rear-side restraining portion (restraining portion)
61, 161: Front-side restraining portion (restraining portion)
65, 67, 182, 186: Bolt
69, 70, 169, 170: Deflection space
126: Output protector (protector)
200: First sub-bus bar
201: Second sub-bus bar

The invention claimed is:

1. A wiring module to be attached to a power storage module that includes a plurality of power storage devices that include electrodes, the wiring module comprising:
a protector that includes a bus bar that is connected to a sub-bus bar that is connected to one of the electrodes, and is made of an insulating material; and
a cover that covers the bus bar,
wherein the protector is provided with a latching portion having a first side and a second side, the first side is configured to latch to a portion of the power storage module, and the second side opposes the first side, and
the cover is provided with a restraining portion that restrains elastic deformation of the latching portion and that is disposed on the second side of the latching portion and within a deflection space for the latching portion.

2. The wiring module according to claim 1,
wherein the restraining portion includes a cover-side latching portion configured to latch to a portion of the power storage module.

3. The wiring module according to claim 1,
wherein the restraining portion includes an abutment wall that abuts the latching portion and thereby restrains elastic deformation of the latching portion in a state in which the latching portion is disposed within the deflection space.

4. The wiring module according to claim 3,
wherein the abutment wall includes, on a face opposite to the latching portion, a reinforcing wall that extends in a direction away from the latching portion.

5. The wiring module according to claim 1,
wherein the restraining portion has a rectangular tube shape.

6. The wiring module according to claim 1,
wherein a bolt or a nut is attached to the bus bar.

7. The wiring module according to claim 6,
wherein the bus bar includes a fastening portion to which the bolt or the nut is attached, and
the latching portion is provided at a position spaced apart from an axis line of the bolt or the nut in a radial direction of the bolt or the nut.

\* \* \* \* \*